US010007715B1

(12) United States Patent
Ashcraft et al.

(10) Patent No.: US 10,007,715 B1
(45) Date of Patent: *Jun. 26, 2018

(54) DATABASE REPLICATION

(71) Applicant: Google LLC, Mountain View, CA (US)

(72) Inventors: Kenneth M. Ashcraft, Palo Alto, CA (US); Vishal Kasera, Mountain View, CA (US); Jean-Michel Leon, Santa Clara, CA (US); Amit Agarwal, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/172,582

(22) Filed: Jun. 3, 2016

Related U.S. Application Data

(63) Continuation of application No. 14/444,220, filed on Jul. 28, 2014, now Pat. No. 9,361,348, which is a continuation of application No. 13/646,015, filed on Oct. 5, 2012, now Pat. No. 8,838,539.

(60) Provisional application No. 61/543,430, filed on Oct. 5, 2011.

(51) Int. Cl.
*G06F 17/30* (2006.01)
*H04L 29/06* (2006.01)
*H04L 12/861* (2013.01)

(52) U.S. Cl.
CPC .. *G06F 17/30575* (2013.01); *G06F 17/30303* (2013.01); *H04L 49/9005* (2013.01); *H04L 67/42* (2013.01)

(58) Field of Classification Search
CPC .............................. H04L 67/42; H04L 49/9005
See application file for complete search history.

(56) References Cited

U.S. PATENT DOCUMENTS

| 7,065,618 | B1 | 6/2006 | Ghemawat et al. |
| 7,421,554 | B2 * | 9/2008 | Colgrove ............ G06F 11/2064 707/999.202 |
| 7,783,787 | B1 | 8/2010 | DeBergalis et al. |
| 8,001,346 | B2 * | 8/2011 | Colgrove ............ G06F 11/2064 707/639 |

(Continued)

OTHER PUBLICATIONS

Baker et al., "Megastore: Providing Scalable, Highly Available Storage for Interactive Services," presented at the 5th Biennial Conference on Innovative Data Systems Research (CIDR '11) Jan. 9-12, 2011, pp. 223-234.

*Primary Examiner* — Debbie Le
(74) *Attorney, Agent, or Firm* — Fish & Richardson P.C.

(57) ABSTRACT

A database server receives a request from a client application for performing a data transaction on persistent data storage. The request is sent to a set of replication servers. An acknowledgement for the request is received from each replication server, including a start sequence number and an end sequence number for data that is stored in local cache of the replication server, and a latest committed sequence number for data that was written to the persistent data storage by the replication server. A maximum value of latest committed sequence numbers received from the set of replication servers is determined. For each replication server, it is examined whether there is a gap between the start sequence number for data stored in local cache and the maximum value of the latest committed sequence numbers. Based on the examining, it is determined whether there is an occurrence of loss of data.

25 Claims, 8 Drawing Sheets

(56) References Cited

U.S. PATENT DOCUMENTS

| | | |
|---|---|---|
| 8,090,880 B2 | 1/2012 | Hasha et al. |
| 8,180,838 B2 | 5/2012 | Tan |
| 8,190,838 B1 | 5/2012 | Sivasubramanian |
| 8,204,856 B2 | 6/2012 | Meyer et al. |
| 8,549,180 B2 | 10/2013 | Critchley et al. |
| 8,838,539 B1 | 9/2014 | Ashcraft et al. |
| 8,924,347 B1 | 12/2014 | Kasera et al. |
| 9,002,793 B1 | 4/2015 | Ashcraft et al. |
| 2009/0157766 A1* | 6/2009 | Shen ................ G06F 11/2097 |
| 2010/0131468 A1 | 5/2010 | Thakore |
| 2010/0153415 A1* | 6/2010 | Muntz ............... H04L 67/1097 707/758 |
| 2011/0131288 A1 | 6/2011 | Patel |
| 2012/0197958 A1 | 8/2012 | Nightingale et al. |

* cited by examiner

DATABASE REPLICATION

CROSS-REFERENCE TO RELATED APPLICATIONS

This application is a continuation of Ser. No. 14/444,220, filed Jul. 28, 2014, which claims the benefit of U.S. application Ser. No. 13/646,015, filed Oct. 5, 2012, which claims the benefit of U.S. Provisional Application Ser. No. 61/543,430, filed on Oct. 5, 2011, the entirety of which are hereby incorporated by reference as if fully set forth therein.

TECHNICAL FIELD

This document relates to data replication such as database replication.

BACKGROUND

A service provider may provide database services for remote client applications. The database services may be hosted using database servers spread across multiple data centers.

SUMMARY

In one aspect, a write request for writing data to persistent data storage is received at a database server from a client application. In response to receiving the write request, the database server selects a set of multiple replication servers. The data is sent from the database server to the selected set of multiple replication servers for writing to the persistent data storage. Confirmation is received at the database server from replication servers in the selected set of multiple replication servers. In response to receiving confirmation from the replication servers in the selected set of multiple replication servers, the database server sends to the client application information indicating success of the write request.

Implementations may include one or more of the following. For example, selecting the set of multiple replication servers in response to receiving the write request may comprise determining, by the database server, that a mastership is acquired by the database server for servicing the write request and selecting, by the database server, the set of multiple replication servers in response to determining that a mastership is acquired. The mastership may indicate a lease on persistent data storage by an instance of the database server that is configured for servicing the write request from the client application.

Selecting the set of multiple replication servers may comprise selecting the set of multiple replication servers from an available pool of replication servers based on a random selection mechanism. Selecting the set of multiple replication servers may comprise determining a level of quality guarantee that is provided to a user associated with the client application, and selecting the set of multiple replication servers in geographically distributed locations based on the determined level of quality guarantee. The level of quality guarantee may be based on different price structures, the quality guarantee including at least one of a lower bound on data durability and an upper bound on latency experienced in using the database server.

Selecting the set of multiple replication servers may comprise determining an attribute chosen by a user associated with the client application, the attribute selected from the group consisting of a number of replication servers, location of replication servers, size of cache in each replication server used for the client application, location of the persistent data storage and size of the persistent data storage, and selecting the set of multiple replication servers based on the determined attribute. Selecting the set of multiple replication servers may comprise performing the selection of the set of multiple replication servers independently for each write request.

The database server may receive a second write request from the client application for writing second data to persistent data storage. In response to receiving the second write request, the database server may select a second set of multiple replication servers. The second data may be sent from the database server to the second set of multiple replication servers for writing to the persistent data storage. The database server may receive confirmation from less than all of the replication servers in the second set of multiple replication servers. In response to receiving confirmation from less than all of the replication servers in the second set of multiple replication servers, the database server may select one or more additional replication servers as replacement for the replication servers from which confirmation is not received, and send the second data from the database server to the additional replication servers.

The database server may receive confirmation from the one or more additional replication servers. In response to receiving confirmation from the one or more additional replication servers, information may be sent from the database server to the client application indicating success of the second write request. The replication servers in the selected set of multiple replication servers may be geographically distributed.

In another aspect, a first write request for writing first data to persistent data storage is received at a replication server from a database server. The replication server determines that the first write request is designated as asynchronous. In response to determining that the first write request is asynchronous, the first data is saved to local cache at the replication server and an acknowledgement is sent to the database server. The local cache stores second data to be written to persistent data storage when the first data is saved to the local cache. The first data and the second data are written from the local cache to the persistent data storage in a batch operation.

Implementations may include one or more of the following. The write request may include information on a lease on the persistent data storage by the database server for servicing the first write request. The replication server may determine that the information on the lease matches lease information locally stored at the replication server. The first data may be saved to the local cache in response to determining that the information on the lease matches lease information locally stored at the replication server. Writing the first data and the second data from the local cache to the persistent data storage in a batch operation may comprise renewing the lease on the persistent data storage for the database server.

The replication server may receive a second write request from the database server for writing third data to persistent data storage. The replication server may determine that the second write request is designated as synchronous. In response to determining that the second write request is synchronous, the third data may be written to persistent data storage and an acknowledgement may be sent to the database server after writing the third data to persistent storage.

Determining that the first write request is designated as asynchronous may comprise determining that the first write request is asynchronous based on information received with the first write request. The information may be provided by one of the database server or a client application that originated the first write request.

Writing the first data and the second data from the local cache to the persistent data storage in a batch operation may comprise determining whether a threshold is reached for writing the locally cached data to the persistent data storage. Based on determining that the threshold is reached, the first data and the second data may be written from the local cache to the persistent data storage in the batch operation. The threshold may be based on at least one of an amount of data in the local cache or a time period that is user configurable.

A replication server may be configured to perform read and write operations directly on the persistent data storage. Writing the first data and the second data to the persistent data storage in a batch operation may comprise determining that sequence numbers associated with the first data and the second data are contiguous. The first data and the second data may be written to the persistent data storage in the batch operation in response to determining that the sequence numbers are contiguous.

Writing the first data and the second data from the local cache to the persistent data storage in a batch operation may comprise determining that the first data and the second data have not been written to persistent data storage by another replication server. The first data and the second data may be written from the local cache to the persistent data storage in the batch operation in response to determining that the first data and the second data have not been written to persistent data storage by another replication server.

Writing the first data and the second data from the local cache to the persistent data storage in the batch operation may be performed independently of a state of operation of the database server. The replication server may be included in a group of replication servers that are geographically distributed.

In another aspect, a first write request for writing first data to persistent data storage and an indication that the first write request is designated as asynchronous are received at a database server from a client application. In response to receiving the first write request, the database server selects a first set of replication servers. The database server determines that the first write request is designated as asynchronous. The first data is sent from the database server to the first set of replication servers for writing to the persistent data storage, along with an indication that the first write request is asynchronous, wherein replication servers included in the first set are configured to save the data to respective local caches in response to receiving the indication that the first write request is asynchronous, send a confirmation to the database server when the data is saved to the respective local caches, and write the first data to persistent storage in a batch operation with other data stored in the respective local caches. Confirmation is received at the database server from the replication servers in the first set. In response to receiving confirmation from the replication servers in the first set, information indicating success of the first write request is sent from the database server to the client application.

The database server receives from the client application a second write request for writing second data to persistent data storage and an indication that the second write request is designated as synchronous. In response to receiving the second write request, the database server selects a second set of replication servers. The database server determines that the second write request is designated as synchronous. The second data is sent from the database server to the second set of replication servers for writing to the persistent data storage, along with an indication that the second write request is synchronous, wherein replication servers included in the second set are configured to write the second data to persistent data storage in response to receiving the indication that the second write request is synchronous and send confirmation to the database server after writing the second data to persistent storage. Confirmation is received at the database server from the replication servers in the second set. In response to receiving confirmation from the replication servers in the second set, information is sent from the database server to the client application indicating success of the second write request.

Implementations may include one or more of the following. The replication servers included in at least one of the first set or the second set may be geographically distributed. A replication server may be configured for performing read and write operations directly on the persistent data storage.

Receiving the first write request from the client application for writing the first data to persistent data storage may include determining, by the database server, whether a mastership is acquired by the database server for servicing the first write request, and selecting, by the database server, the first set of replication servers in response determining that mastership is acquired for servicing the first write request. The mastership may indicate a lease on persistent data storage by an instance of the database server that is configured for servicing the first write request from the client application. Determining whether a mastership is acquired for servicing the first write request may include generating, by the database server, a mastership identifier associated with servicing the first write request based on determining that mastership is not acquired for servicing the first write request, and sending an instruction from the database server to a replication server for writing a lease to an underlying replication mechanism that is configured for writing data to the persistent data storage, the instruction including the mastership identifier.

Sending the first data from the database server to the first set of replication servers for writing to the persistent data storage may include sending information on a lease on the persistent data storage by the database server for servicing the first write request. A replication server included in the first set may determine whether the information on the lease matches lease information locally stored at the replication server. The first data may be saved to the local cache at the replication server based on determining that the information on the lease matches lease information locally stored at the replication server. The replication server may configured for renewing the lease on the persistent data storage for the database server upon writing the locally cached data to the persistent data storage.

In another aspect, a read request is received at a database server from a client application for reading data from persistent data storage. The database server determines whether one or more replication servers associated with the database server have a complete cache window corresponding to data of the client application. A complete cache window indicates an entire amount of uncommitted data for the client application is stored in a local cache of a replication server and the uncommitted data is contiguous with committed data associated with the client application. Committed data is data that has been written to persistent data storage and uncommitted data is data that has not been written to persistent data storage but is in local cache of the replication servers. Based on determining that one or more replication servers associated with the database server have a complete cache window, a replication server is selected from the one or more replication servers, and the read request is sent to the selected replication server.

Implementations may include one or more of the following. The one or more replication servers may be geographically distributed. A replication server may be configured to perform read and write operations directly on the persistent data storage.

Sequence numbers may be associated with the data. A replication server may have a cache start sequence number and a cache end sequence number for uncommitted data for the client application present in the local cache of the replication server, the cache start sequence number associated with least recent uncommitted data for the client application present in the local cache and the cache end sequence number associated with most recent uncommitted data for the client application present in the local cache.

A difference between the cache start sequence number and the cache end sequence number for the uncommitted data in the local cache of the replication server may indicate a cache window for the client application at the replication server. The cache window may include the complete cache window for the client application if the local cache includes data with a sequence number that is greater by one than a highest sequence number of committed data for the client application, and the cache end sequence number corresponds to a highest sequence number of the uncommitted data for the client application received from the database server by the one or more replication servers.

Determining whether one or more replication servers associated with the database server have a complete cache window corresponding to data of the client application may include receiving, at the database server and from each replication server, a cache start sequence number and a cache end sequence number associated with the respective replication server, along with information indicating a highest sequence number of the data committed by the replication server for the client application. An overall highest sequence number of the committed data for the client application may be determined based on the information received from the replication servers. A subset of the replication servers that each have data with a sequence number that is greater than the overall highest sequence number by one may be selected. A replication server in the selected subset of the replication servers with a highest value of the cache end sequence number may be determined. The determined replication server may be selected as having a complete cache window.

Selecting a replication server from the one or more replication servers may include selecting the replication server from the one or more replication servers based on a random selection mechanism. Selecting a replication server from the one or more replication servers may include determining a level of processing activity at each of the one or more replication servers. A replication server with a level of processing activity that is lower than the level of processing activity associated with all other replication servers in the one or more replication servers may be selected.

In another aspect, a user associated with a client application is provided with a set of different levels of quality guarantee associated with a database server, which is configured for performing read and write requests on persistent data storage for the client application. Selection of a particular level of quality guarantee from the set of different levels of quality guarantee is received from the user. Responsive to receiving the selection of the particular level of quality guarantee, values of one or more attributes associated with the database server are determined. The one or more attributes include different values for different levels of quality guarantee. Based on determining the values of the one or more attributes, a set of replications servers are configured for performing read and write operations on the persistent data storage based on the read and write requests from the client application.

Implementations may include one or more of the following. A replication server may be configured for performing read and write operations directly on the persistent data storage. The different levels of quality guarantee may be based on different price structures.

The one or more attributes may include data durability provided to data associated with the client application, latency experienced by the client application in using the database server for performing read and write requests on the persistent data storage and peak throughput of the replication servers in writing data to the persistent data storage.

Configuring a set of replications servers may include selecting a number and geographic distribution of replication servers for performing read and write requests on persistent data storage for the client application. The number and the geographic distribution may be based on the value of data durability to be provided to data associated with the client application. The number of the replication servers selected may be higher for higher values of data durability than lower values of data durability. The geographic distribution of the replication servers selected may be greater for higher values of data durability than lower values of data durability. The geographic distribution of the replication servers selected may be lower for higher values of the peak throughput.

Configuring a set of replications servers may include configuring a size of local cache in each replication server. The local cache in a replication server may be configured for temporary storage of data for the client application before being written to the persistent data storage. The size of the local cache in a replication server may be configured to be smaller for higher values of data durability than lower values of data durability. The size of the local cache in a replication may be configured to be larger for lower values of latency experienced by the client application than higher values of latency. The size of the local cache in a replication server may be configured to be larger for higher values of the peak throughput.

Configuring a set of replications servers may include selecting a number and geographic distribution of persistent data storage for performing read and write requests for the client application. The number and the geographic distribution may be based on at least one of the value of data durability to be provided to data associated with the client application and the latency experienced by the client application. The number of the persistent data storage selected may be higher for higher values of data durability than lower values of data durability. The number of the persistent data storage selected may be lower for lower values of latency experienced by the client application than higher values of latency. The geographic distribution of the persistent data storage selected may be greater for higher values of data durability than lower values of data durability. The geographic distribution of the persistent data storage selected may be lower for higher values of the peak throughput.

The database server may receive from the user of the client application selection of a new level of quality guarantee from the set of different levels of quality guarantee at a time when the database server is processing read and write requests for the client application based on the particular level of quality guarantee selected previously. The new level of quality guarantee may be different from the particular level of quality guarantee selected previously. Responsive to receiving the selection of the new level of quality guarantee, new values of the one or more attributes associated with the database server may be determined. Based on the new values of the one or more attributes, a new set of replications servers may be configured for performing read and write operations on the persistent data storage based on the read and write requests from the client application.

In another aspect, a request is received at a database server from a client application for performing a data transaction on persistent data storage. The request is sent to a set of replication servers. An acknowledgement for the request is received from each replication server, including a start sequence number and an end sequence number for data associated with the client application that is stored in local cache of the replication server, and a latest committed sequence number for data associated with the client application that was written to the persistent data storage by the replication server. A maximum value of latest committed sequence numbers received from the set of replication servers is determined. For each replication server, it is examined whether there is a gap between the start sequence number for data stored in local cache of the replication server and the maximum value of the latest committed sequence numbers. Based on the examining, it is determined whether there is an occurrence of loss of data associated with the client application.

Implementations may include one or more of the following. Examining whether there is a gap between the start sequence number for data stored in local cache of the replication server and the maximum value of the latest committed sequence numbers may include identifying that there is a gap between the start sequence number for data stored in local cache of each replication server and the determined maximum value of the latest committed sequence numbers. Determining whether there is an occurrence of loss of data associated with the client application based on the examining may include determining that there is an occurrence of loss of data associated with the client application based on identifying that there is a gap for each replication server.

Examining whether there is a gap between the start sequence number for data stored in local cache of the replication server and the maximum value of the latest committed sequence numbers may include identifying at least one replication server for which there is no gap between the start sequence number for data stored in the respective local cache and the determined maximum value of the latest committed sequence numbers. Determining whether there is an occurrence of loss of data associated with the client application based on the examining may include determining that there is no occurrence of loss of data associated with the client application based on identifying the at least one replication server.

A replication server may be configured for performing read and write operations directly on the persistent data storage. Sending the request to a set of replication servers may include determining a set of replication servers that are configured for performing data transactions associated with the client application, and sending the request to the determined set of replication servers.

Implementations of the above techniques include a method, computer program product and a system. The computer program product is suitably embodied in a non-transitory machine-readable medium and includes instructions executable by one or more processors. The instructions are configured to cause the one or more processors to perform the above described actions.

The system includes one or more processors and instructions embedded in a non-transitory machine-readable medium that are executable by the one or more processors. The instructions, when executed, are configured to cause the one or more processors to perform the above described actions.

The details of one or more implementations are set forth in the accompanying drawings and the description below. Other features, aspects, and advantages will become apparent from the description, the drawings, and the claims.

DESCRIPTION OF DRAWINGS

Like reference symbols in the various drawings indicate like elements.

DETAILED DESCRIPTION

Figure 1:
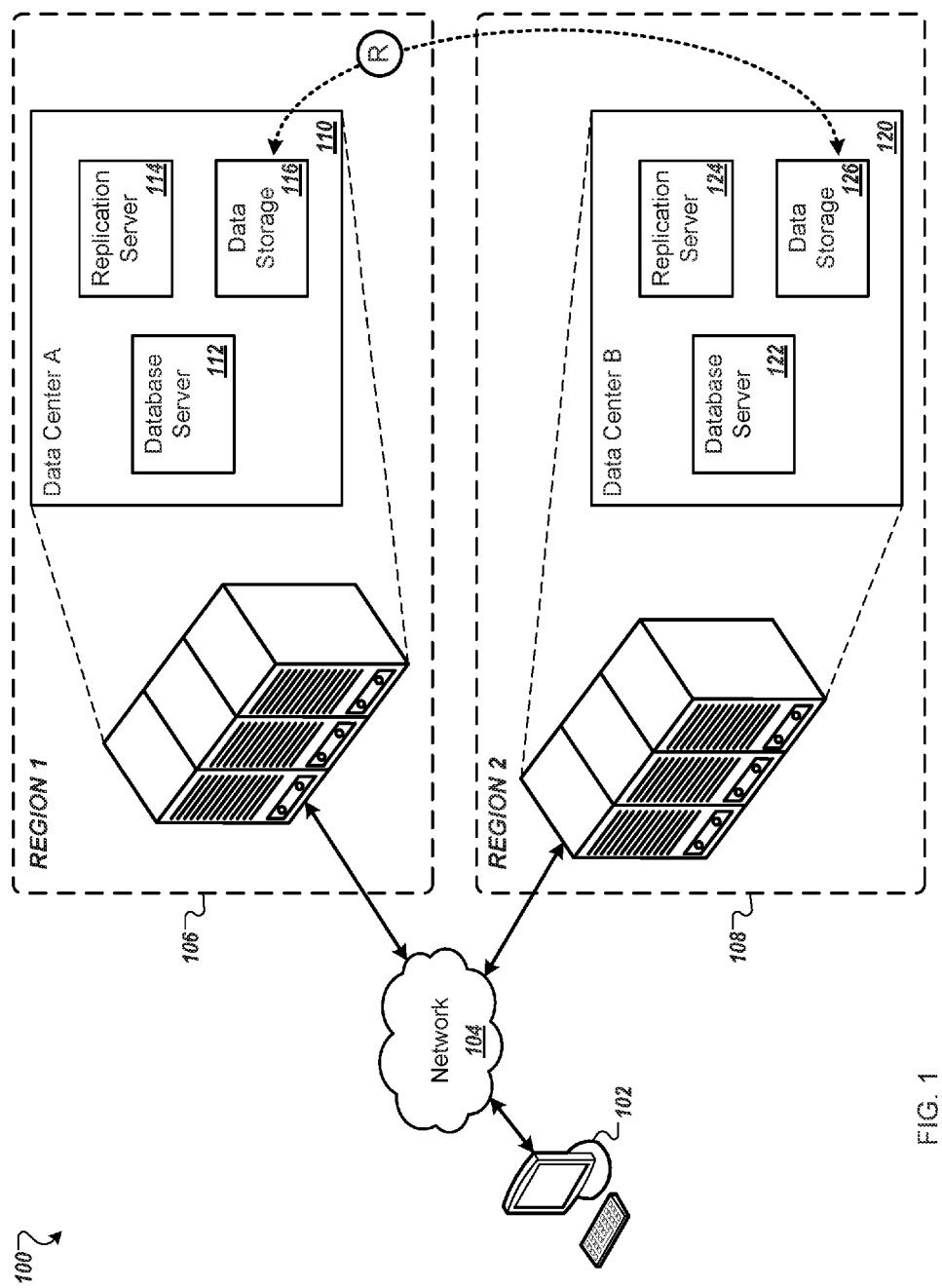
FIG. 1 is a block diagram illustrating an example of a system that may be used to implement data replication for a hosted database service with distributed data centers.

FIG. 1 is a block diagram illustrating an example of a system 100 that may be used to implement data replication for a hosted database service with distributed data centers. As shown, the system 100 includes a client device 102 that may communicate over a network 104 with a database system hosted by a database service provider that includes data centers geographically distributed in different regions, for example, region 1 106 and region 2 108. Region 1 106 includes a data center A 110 that has a database server 112, a replication server 114 and data storage 116. The data centers in different regions may include similar components for providing access to the data stored on the system. For example, as shown, region 2 108 includes a data center B 120 that has a database server 122, a replication server 124 and data storage 126. Although only a single data center is shown in each region for clarity of presentation, it should be understood that each region may include one or more data centers, for example, for purposes of balancing the storage and/or data access requirements of the region, or for providing increased data redundancy and/or availability.

The client device 102 may execute a database application and access the associated database using the resources provided by the hosted database service. The hosted database service may enable the application to store the data remotely using a geographically distributed storage system provided by the hosted database service, and retrieve data from the remote storage as needed. The hosted database service may enable remote data storage and replication for redundancy, for example, to prevent data loss in case a data store gets corrupted, or for any other suitable reason. In some implementations, the client device 102 may represent a web application running in one of the data centers, for example, a hosted application that is running in either data center A 110 or data center B 120.

The client device 102 may be, for example, a desktop computer, a tablet computer, a notebook computer, a laptop computer, a smart phone, an e-book reader, a music player, or any other appropriate portable or stationary computing device. The client device 102 may include one or more processors configured to execute instructions stored by a computer readable medium for performing various client operations, such as input/output, communication, data processing, and the like. In general, the client device 102 may be implemented using a computing device such as the computing device 800 or the mobile device 850 that are described in the following sections.

The database services that the client device 102 accesses in the hosted database service are exchanged with the hosted database service over the network 104. The network 104 may include a circuit-switched data network, a packet-switched data network, or any other network able to carry data, for example, Internet Protocol (IP)-based or asynchronous transfer mode (ATM)-based networks, including wired or wireless networks. The network 104 may be configured to handle web traffic such as hypertext transfer protocol (HTTP) traffic and hypertext markup language (HTML) traffic. The network 104 may include the Internet, Wide Area Networks (WANs), Local Area Networks (LANs), analog or digital wired and wireless networks (for example, IEEE 802.11 networks, Public Switched Telephone Network (PSTN), Integrated Services Digital Network (ISDN), and Digital Subscriber Line (xDSL)), Third Generation (3G) or Fourth Generation (4G) mobile telecommunications networks, a wired Ethernet network, a private network such as an intranet, radio, television, cable, satellite, and/or any other delivery or tunneling mechanism for carrying data, or any appropriate combination of such networks.

The hosted database service may be implemented as a network-connected, fault tolerant and redundant distributed data service that is provided by a database service provider to users such as a user of the client device 102. The fault tolerance and redundancy may be provided by data replication in which the database resources are replicated across multiple data centers. The hosted database service provides data processing and access to stored data to database applications running on client devices that may be remotely located.

The database service provider may own and/or manage a number of facilities that host the data centers, for example, data center A 110 or data center B 120. A data center may include an enclosed space and can occupy a building, such as a large and open warehouse or shed space, or be one or more rooms within a building. The enclosed space may be sufficiently large for installation of a large number (for example, dozens or hundreds or thousands) of racks of computer equipment, and may house a large number (for example, tens, hundreds, thousands or tens of thousands) of computers.

A number of such data centers may be dispersed in different geographic regions, for example across one or more states, countries, and/or continents. The different regions may correspond to any appropriate geographical subdivisions as determined by the database service provider. For example, region 1 106 may be in the United States, while region 2 108 may be in Canada. In some implementations, combinations of geographic subdivisions may be used to define one or more regions.

The facilities or data centers may be communicably linked through a data network such as the Internet, or via a private network such as a fiber network owned by or that is otherwise accessible to the database service provider. Each data center may have a number of different features. For example, data center A 110 includes one or more of each of the database server 112, the replication server 114 and the data storage 116. In addition, data center A 110 may include other components and modules that are not shown, for example, a dedicated gateway that interfaces to the network 104, or a resource table indexing all the resources present in the data center A 110.

Different data centers may have different hardware and software, operating costs, or usage profiles. For example, the components and modules included in data center B 120 may be similar to the components and modules included in data center A, or they may be dissimilar. For example, data center B 120 may include a different number of the database server 122, the replication server 124, and/or the data storage 126.

Each database server 112 or 122 may generally be a server computer hosting one or more software processes that are configured to receive and process read/write data transactions, also referred to as requests, from users of the system. For example, when a database application running on client device 102 sends a write transaction to data center A 110, the request may be received by the database server 112, which may then process the request and attempt to persist the transaction in storage. In some implementations, the database server 112 may include one or more software applications such as a hosted database, for example, MySQL, and a virtual file system (VFS) that interfaces the database with other devices in the data center, such as the replication server 114 or 124 and the data storage 116 or 126. Each database server 112 or 122 may run multiple clones or instances of the software applications to perform parallel processing, that is, handle multiple requests from different client devices separately at the same time. In some implementations, multiple clone processes may be configured to handle multiple requests from the same client device, for example, from different applications running on a client device.

Each replication server 114 or 124 may generally be a server computer hosting one or more software processes and configured to act as a proxy between the database server 112 or 122 and the data storage 116 or 126. For example, replication server 114 or 124 may be configured to accept read/write transactions from the database server 112 or 122 and apply them to the data storage 116 or 126. Each of replication servers 114 or 124 may accept a write transaction from the database server 112 or 122, and write the associated data to a local cache in the respective replication server.

In some implementations, replication server 114 or 124 may be a JAVA server. The local cache may be an in-memory cache in the random access memory (RAM) of the replication server, or implemented in a section of a hard disk, solid state drive or phase-change memory coupled to the replication server. By storing write transactions in local caches, the replication servers may enable the database servers 112 or 122 to continue processing transactions, while the replication servers may asynchronously perform the relatively slower copy operations of the cache data to the data storage. At certain rigger points, the replication server 114 or 124 may batch together all the data in its local cache and perform a write of the batched data in the cache to data storage 116 or 126.

In some implementations, trigger points may not be used. Instead, each replication server may be configured to dynamically determine, at run time, an appropriate time to batch the data in local cache and write the batched data to persistent data storage. Each replication server may be configured to write the data to more than one data storage. For example, replication server 114 may write the data to data storage 116 that is locally present in the data center A 110. In addition, replication server 114 may replicate the data by writing to additional, remote data storage present in other data centers, such as data storage 126 in geographically distributed data center B 120. In order to write to remote data storage, a replication server may use a dedicated connection to the remote storage, such as an intranet accessible by the database service provider, or it may share connections established over public networks, such as the Internet.

The data storage 116 or 126 may generally be a storage device that is configured to write data to storage included within. Examples of data storage 116 or 126 include a hard disk, or an array of hard disks, magnetic, magneto-optical disks, optical disks, or any other suitable form of magnetic, optical or solid state storage device. A data center may include multiple such data storage, for example, an array of interconnected storage devices. Examples of data storage 116 or 126 include, in addition, hosted data storage services that may be provided by storage service providers.

The data stored in the various data storage, for example, data storage 116 or 126, may be replicated amongst multiple different data centers in the various regions of the geographically distributed hosted database service. For example, as indicated by the dashed line labeled R, the data in either data storage 116 or 126 may be replicated between data centers A 110 and B 120 in region 1 106 and region 2 108, respectively.

In some implementations, the data may be replicated using strongly consistent replication such that the data stored in each data storage is consistent at any given time with the data stored in each of the other data storage across the entire system providing the database service. In other words, by using strongly consistent replication of the data, all of the data centers throughout the database service system may have a consistent view of where a particular data is located in the system, regardless of the particular database server receiving the read transaction.

Figure 2:
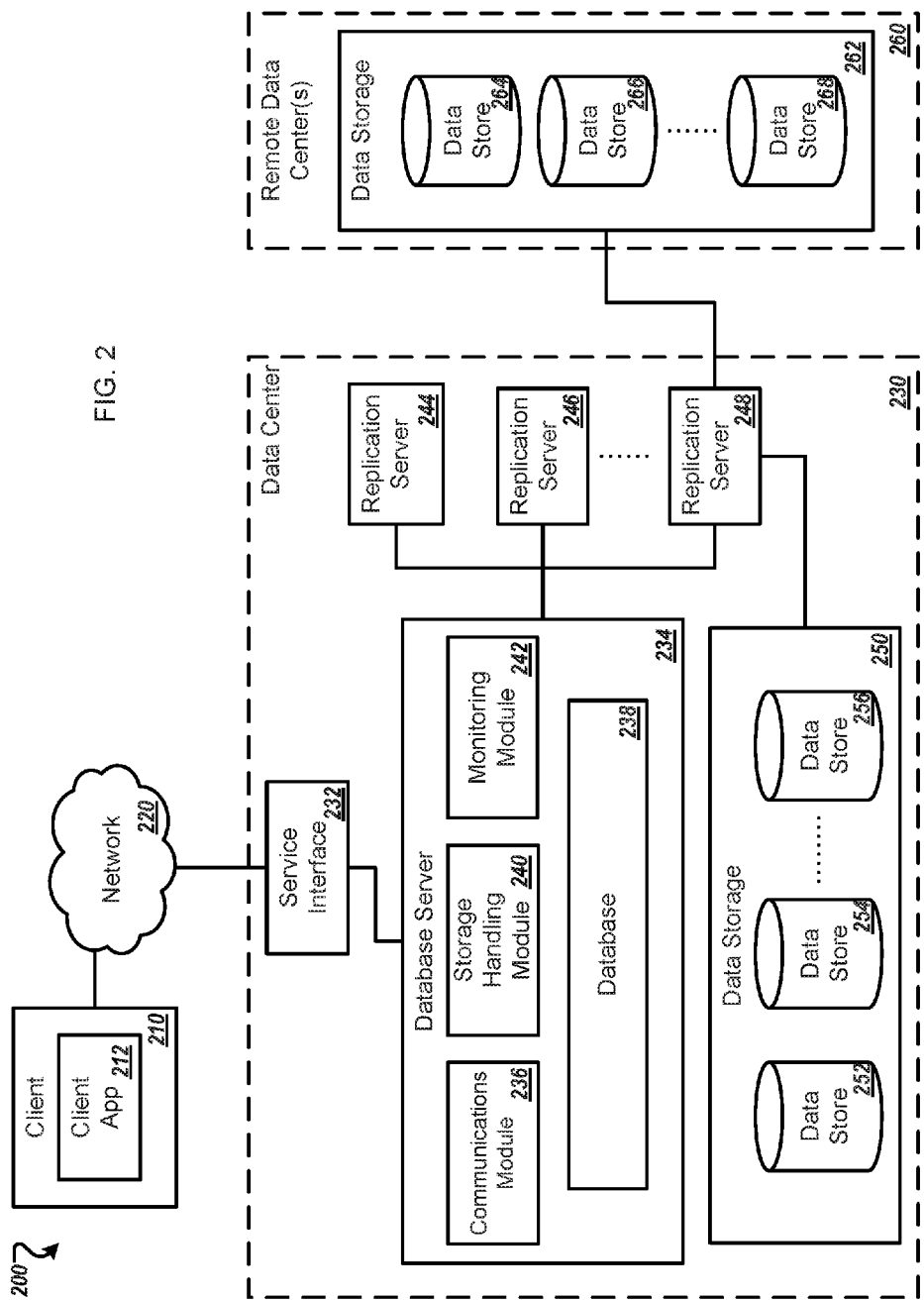
FIG. 2 is a block diagram illustrating an example of a system that may implement data replication for a hosted database service with distributed data centers.

FIG. 2 is a block diagram illustrating an example of a system 200 that may implement data replication for a hosted database service with distributed data centers. The system 200 may be similar to the system 100 such that the data center 230 may be implemented, for example, either using the data center 110 or the data center 120. Although the following sections describe the system 200 with respect to database services and applications, the system 200 may be used, for example, in a hosted data storage service that employs distributed data storage and data replication. More generally, the techniques described throughout this document may be implemented in any appropriate environment that employs replicated data storage, such as a distributed file system, non-relational structured storage, transaction processing systems and consumer and enterprise applications.

The system 200 includes a client device 210 that communicates via a network 220 with the data center 230. The data center 230 may be a part of a geographically distributed hosted database service that has multiple data centers across different regions, including the one or more remote data centers 260. For example, the data center 230 may be data center A 110 located in region 1 106, while a remote data center 260 may be data center B 120 in region 2 108.

The data center 230 includes a service interface 232 that connects the data center 230 to one or more client devices via the network 220. Data center 230 also includes at least one database server 234, multiple replication servers 244, 246 and 248, and data storage 250. The database server 234 has one or more modules, such as communications module 236, database 238, storage handling module 240 and a monitoring module 242. The data storage 250 includes multiple data stores 252, 254 and 256. Although the system 200 shows multiple replication servers 244, 246 and 248, in some implementations, a single replication server may be used. Similarly, in some implementations, a single data store may be used, instead of the multiple data stores 252, 254 and 256 that are shown in system 200.

Each remote data center 260 includes data storage 262 that comprises multiple data stores 264, 266 and 268. However, in some implementations, a single data store may be used instead of multiple data stores. In addition, each remote data center 260 may include one or more components (not shown) that are similar to data center 230. Each remote data center 260 also may include one or more components (not shown) that are different from the components in data center 230.

The hosted database service in system 200 may provide scalable stores for storing data resources associated with the database applications utilizing the hosted database service. Database applications running on the client device 210 may upload data to the hosted database service including the data centers 230 and 260 and control access to the uploaded data. Access control may include a range of sharing levels (for example, private, shared with one or more individuals, shared with one or more groups, public, etc.). The database applications running on client device 210 may utilize the hosted database service for any number of a variety of reasons. For example, the database service may be used for business reasons (for example, submission of work product ordered by the owner and/or manager of the hosted database service), or for use in data processing by other services (for example, using uploaded images to automatically and dynamically create a photo gallery web page).

The client device 210 may be similar to the client device 102. The client device 210 may communicate across the network 220 using communication protocols such as, for example, one or more of Transmission Control Protocol/Internet Protocol (TCP/IP), Hypertext Transfer Protocol (HTTP), or other appropriate protocols. While only a single client device 210 is shown, there may be multiple client devices communicating across the network 220 with the hosted database service, represented by the data center 230, and/or other services and devices. In addition, there may be one or more client devices running in data center 230.

The network 220 may be similar to the network 104. In some implementations, different client devices 210 may communicate with the database service over different networks 220, while in some other implementations, different client devices 210 communicate with the database service over a single network 220.

The data center 230 may be implemented such that database applications executing on client device 210, such as a client application 212, may read or write to the database service hosted by the data center 230. In general, a request, such as a read or write transaction, that is sent by the client application 212 to the data center 230, is received at the data center by the service interface 232. For example, in some implementations, the database service may be implemented as a World Wide Web (WWW) service with a corresponding set of web service application programming interfaces (APIs). The web service APIs may be implemented, for example, as a Representational State Transfer (REST)-based HTTP interface or a Simple Object Access Protocol (SOAP)-based interface. Service interface 232 may receive requests from the client application 212 and parse the requests into a format usable by the database server 234 in the backend, such as a remote procedure call (RPC) that is understandable by the database server 234. The service interface 232 may format responses generated by the database server 234 for transmission to the client application 210. In some implementations, multiple service interfaces 232 may be implemented, for example to support multiple access protocols.

The service interface 232 may include a graphical user interface (GUI) front end, for example to display on a web browser for data access. The GUI may provide the ability to submit database queries, such as SQL queries, to perform reads and writes on the database. The service interface 232 may monitor load information and update logs, for example to track and protect against denial of service (DOS) attacks.

The database server 234 may be similar to either database server 112 or 122. The database server 234 may handle request authentication and authorization, manage data and metadata, and track activity such as for billing. The database server 234 may also provide additional or alternative functionality. For example, the database server 234 may provide functionality for load balancing for resource utilization and responsiveness under heavy loads.

The database server 234 includes one or more modules that perform various functionalities for the hosted database service, for example, functionalities for processing database requests and for data storage and replication. The modules may be implemented in software, or they may be implemented in hardware, or a suitable combination of software and hardware. For example, the modules may include one or more software processes interacting with one or more processors coupled to the database server 234 to perform various functions.

One of the modules in the database server 234 is the communications module 236. The communications module 236 communicates with the service interface 234 to receive client requests and to return data or acknowledgments due to processing based on the client requests.

A client application request, for example, a read or write transaction, that is received at the database server 234 by the communications module 236 is sent to the database 238 for further processing. The database 238 may manage metadata associated with data resources. In some implementations, the database 238 may be a MYSQL database. The metadata may include access control lists (ACLs), which may generally define who is authorized to perform actions on corresponding resources, and the nature of the permitted actions.

When the database 238 receives a request from the client application 212 running on the client device 210, via the communications module 236, the database 238 processes the request/transaction, and attempts to read or write to the local disk(s) of database server 234, as appropriate. For example, if the request is a write transaction, the database 238 attempts to write the resulting data to the local disk and, if the request is a read transaction, the database 238 attempts to read the appropriate data from the local disk. These access attempts are intercepted by the storage handling module 240. For example, to intercept the access attempts, the storage handling module 240 may replace at link time the native calling routines of the database 238 with routines that are implemented by the storage handling module 240. In a particular example, libc may be replaced at link time with a custom library that intercepts and forwards access attempts to the storage handling module 240. In other cases, the storage handling module 240 may be enabled to intercept the access attempts through the use of a Filesystem in Userspace (FUSE) module implemented by the database server.

In some implementations, the storage handling module 240 implements a virtual file system (VFS). The VFS receives the read or write requests from the database 238 and forwards individual requests to one or more replication servers 244, 246 and 248, using, for example, an RPC. The replication servers 244, 246, and 248 in turn perform bulk operations on the replicated data storage system 250 and 262 based on multiple requests.

The database server 234 also includes a monitoring module 242 that monitors the various processes executing in the database server 234 to insure that the data replication and storage functions are operating correctly. In some implementations, the database server 234 may be configured to simultaneously serve multiple instances of the database 238. Each instance of the database 238 may be serving a different client application. The database server 234 spawns a clone process for each instance of the database 238 that it wants to serve, and runs the instance of the database 238 associated with the clone process. The clone process runs the storage handling module 240 for intercepting the reads or writes from the instance of the database 238 and forwarding RPCs as appropriate to one or more replication servers via the database server 234.

The data center 230 includes a pool of replication servers that are configured to interface between the database server 234 and the data storage 250 and 262. Each replication server may be similar to either replication server 114 or 124. When the database 234 spawns a clone process to handle an instance of the database 238, the clone process selects a number N of replication servers from the pool of replication servers for interfacing with the data storage, for example, replication servers 244, 246 and 248. In one implementation, the number N is three. The storage handling module 240 serving the instance of the database 238 in a clone process sends the read transactions to one of the N selected replication servers, and the write transactions to all N selected replication servers.

The replication servers provide an API that allows the storage handling module 240 to communicate with the replication servers. The API may provide multiple methods, such as read and write transactions. In addition, the API may provide methods to acquire and manage leases by the clone process on the underlying data storage, for example, using a mastership mechanism that is described in the following sections.

In one implementation, the N selected replication servers may be in different racks in the data center 230, in order to reduce the possibility that all selected replication servers may fail at the same time (for example, when compared to a case in which all of the replication servers are in the same rack, in which case a rack failure would result in all replication servers failing). In another implementation, the N selected replication servers may be in different data centers spread across multiple regions, in order to reduce the possibility of failure due to geographically correlated disasters, for example, an earthquake that disrupts the operations of a data center 230. By selecting replication servers that are geographically distributed, the durability guarantees on the stored data may be improved, but the latency for accessing the data may increase while the peak throughput of the replication servers in writing data to the persistent data storage, which is also referred to as peak write throughput or simply throughput, may decrease.

Each of the replication servers may be implemented using hardware and software applications written in an appropriate software programming language, for example, JAVA. A replication server serving an instance of the database 238 accepts a write transaction from the storage handling module 240 associated with the instance of the database 238, and the data associated with the write transaction, and saves the write transaction to a local cache associated with the replication server. In one implementation, the local cache may be implemented in a random access memory (RAM) associated with the replication server, while in another implementation, the local cache may be implemented in a hard disk associated with the replication server. In either implementation, for every write transaction, the replication server sends an acknowledgement to the storage handling module 240 after saving the data to local cache. At certain trigger points, the replication server collects the data saved in local cache and writes the data to the data storage. The trigger point may be, for example, a threshold percentage of the cache getting full, or it may be based on a periodic time interval, or some other suitable trigger. In some implementations, instead of trigger points, each replication server may be configured to dynamically determine, at run time, an appropriate time to batch the data in local cache and write the batched data to persistent data storage. For example, a replication server may execute a write process in a continuous loop that writes data to persistent storage as long as the local cache is not empty. If the replication server detects that some other replication server is succeeding in writing the data to persistent data storage before it, then it backs off and retries after some time.

The replication servers may write the data in batches to multiple data storage for replication, for example, to local data storage 250 and one or more of data storage 262. The replication servers may utilize a distributed mechanism for performing the write across multiple data storage. For example, the replication servers may use a storage system that is based on the PAXOS distributed consensus mechanism, to achieve replication in data storage across multiple data centers. A storage system using the PAXOS algorithm is described, for example, in the paper Baker et al., *Megastore: Providing Scalable, Highly Available Storage for Interactive Services*, presented at the 5$^{th}$ Biennial Conference on Innovative Data Systems Research (CIDR '11) Jan. 9-12, 2011, Asilomar, Calif., USA and available from http://static.googleusercontent.com/external_content/untrusted_dlcp/research.google.com/enus/pub/archive/36971.pdf, which is incorporated herein by reference.

The data storage 250 may include multiple data stores 252, 254 to 256. Although three data stores are shown, more or fewer are possible. Each of the data stores 252-256 may store data in a particular format. For example, data store 252 may store data as Binary Large Object (BLOB), data store 254 may store data in a distributed file system (for example, Network File System), and data store 256 may store data resource in a MYSQL database.

Similarly, the data storage 262 in each remote data center may include multiple data stores 264, 266 and 268. Each of the data stores 264, 266 and 268 may store data in a format that is different from the format for the other data stores. However, in an alternative implementation, all the data stores 264, 266 and 268 may store data in a similar format, or a combination of similar and dissimilar formats.

During operation, a read or write transaction request may be received at the communications module 236 from the service interface 232. In some cases, when the transaction request is received, the database server 234 may have already spawned a clone process for an instance of the database 238 to handle requests from the particular client application 212. In this case, the communications module 236 forwards the request to the instance of the database 238 that is handling the client application 212. However, in other cases, the database server 234 may not have an existing process to handle requests from the particular client 212. In this case, when the communications module 236 receives the request from the service interface 232, the database server 234 spawns a clone process and runs an instance of the database 238 in the clone process to handle the client 212. The database 238 then processes the request, and attempts a read or write to the local filesystem as appropriate. The storage handling module 240 in the clone process intercepts and handles these read or write requests from the instance of the database 238. In addition, the database server 234 selects, from the pool of available replication servers in the data center 230, a number N of replication servers to interface with the data storage for the clone process. In one implementation, the number N is three. In some applications, the database server 234 may select the N replication servers randomly from the pool of available replication servers, while in other implementations, the database server 234 may select the N replication servers based on suitable selection criteria. In case of a write request, the storage handling module 240 forwards the write request, in the form of an RPC, to all N selected replication servers, for example, replication servers 244, 246 and 248. Along with the data, the storage handling module may send a unique sequence number associated with the data. In case of a read request, the storage handling module 240 forwards the read request, in the form of an RPC, to one of the N replication servers that is determined to have a complete cache window, as described in the following sections.

Upon receiving the data from the storage handling module 240, each selected replication server may perform a series of checks to determine that the storage handling module 240 sending the data is authorized to do so for the particular instance of the database 238 that is serving the client 212 and that the data is consistent. The checks may help to ensure that there is only one clone process for a given instance of the database 238 at any one time. If the checks indicate success, each replication server writes the data to its local cache and returns success to the storage handling module 240, along with one or more sequence numbers indicating data that is present in local cache and data that have been written to data storage for the client 212. Upon receiving an indication of success from all N selected replication servers, the storage handling module 240 determines that a successful commit of the write request has been performed. Therefore, from the perspective of the storage handling module 240 and the instance of the database 238, every write request may be considered to be written to persistent data storage immediately.

From the perspective of the replication servers, the write transactions are asynchronous. Each replication server attempts to write to persistent data storage the data stored in its local cache, as described earlier. In one implementation, all the selected replication servers may attempt to write to data storage at the same time. The replication servers may compete to acquire a lock in order to proceed with the write. One replication server may successfully acquire the lock and commit the data, that is, perform the actual write to storage, in which case the other replication servers back off. The replication server that performs the actual write determines success upon receiving an acknowledgement from the distributed mechanism that it utilizes to perform the commit, for example, a storage system that employs the PAXOS algorithm. Upon a determination of success, the replication server flushes or deletes the committed data from its cache. Each replication server that backed off queries the distributed mechanism for the sequence number of the latest committed data and compares the sequence numbers of the data in local cache with the sequence numbers of the data that is committed to the data storage. If the comparison indicates that any data in the local cache of the replication server have been committed to data storage by another replication server, then the replication server deletes from its cache the corresponding data that have been committed.

In some situations, the N selected replication servers may perform synchronous replication, that is, every write request from the storage handling module 240 is immediately committed to data storage. For example, in some implementations, a user utilizing the database services, for example, a user of the client device 210, may be enabled to configure the service to use synchronous or asynchronous replication based on his or her requirements.

Generally speaking, when using synchronous replication, data durability may be high relative to asynchronous replication since every transaction is performed immediately. For example, for a write transaction, the data is written to persistent storage immediately upon receiving the write transaction from the client application, without any wait period. However, when using asynchronous replication, there may be a wait period between receiving a transaction, for example, a write transaction, from the client application and performing the transaction on the persistent storage. During the wait period, the data associated with the transaction may be cached locally in volatile memory in the database server 234 or any of the replication servers 244, 246 and 248. If the database server or the replication servers crash while having in local cache data that has not been written to persistent storage, the data may be lost. That is, if all of the servers caching the data crash before writing to persistent storage, the data may be lost. Therefore, using asynchronous replication the durability provided is usually lower compared to synchronous replication.

On the other hand, synchronous replication may have higher latency and lower throughput compared to asynchronous replication. There is a communications and processing overhead, typically expressed in terms of latency or delay in time units, associated with every read/write transaction that is performed on the persistent data storage. Since in synchronous replication every transaction is performed as an individual operation, multiple transactions that are performed at or near the same time compete for resources. In addition, for each synchronous transaction, the database has to wait a complete cycle to write to persistent storage and receive an acknowledgement of the write, before the database can process the next transaction. The above competition for resources is manifested as higher latency and lower throughput per transaction.

However, in asynchronous replication, the database just has to wait for the transaction to be written to the cache of the replication servers, which batch together multiple transactions and perform the batched transactions on the persistent data storage in one operation. Therefore, the competition for resources is lower, resulting in lower average latency and higher throughput compared to synchronous replication. For example, the latency for synchronous replication across distributed persistent data storage may be of the order of 50-100 milliseconds for one operation. However, the latency for asynchronous replication using three replication servers that are distributed across data centers in a metropolitan geographic area may be of the order of 20 milliseconds.

Given the tradeoffs as described above, synchronous replication may be used when the data is critical such that even a small possibility of data loss due to failure of temporary storage (for example, in replication servers) cannot be tolerated. Synchronous replication also may be used when the amount of data is relatively small such that the overall higher latency and/or lower throughput are within acceptable margins. However, if the applications can withstand small probabilities of data loss, and/or large amounts of data are being committed such that the latency/throughput are important considerations, then asynchronous replication may be preferred.

In addition to allowing a user to select between asynchronous and synchronous replication, the database service may provide a user with the ability to control, either directly or indirectly, other parameters that further effectuate a trade-off between durability, latency and throughput performance. For example, the database service may provide its clients with a user interface or an API through which the user may select one or more attributes of the system that effect a trade-off between data durability and latency and/or throughput performance. The one or more attributes may include, for example, the number N of replication servers, the location of the replication servers and the amount of cache in each replication server that is used for the particular database application. In addition, the one or more attributes may include the geographic distribution and size of the persistent storage hardware.

Increasing the number N of the replication servers may improve the durability, since the probability that at least one replication server will be functioning when the other replication servers crash, is higher with a higher number of the replication servers. Similarly, the durability may be improved by selecting the location of the replication servers such that they are geographically distributed, as described earlier. A reason for this is that the risk of correlated failures that are based on physical proximity decrease as the data centers are geographically distributed. Examples of correlated failures based on physical proximity include a power outage in a data center that takes down the replication servers located in the data center or an earthquake that affects the data centers in a metropolitan area. However, increasing the number N of replication servers or distributing them geographically may have an adverse impact on the average throughput and/or latency. Selecting a higher number of replication servers for serving an instance of the database 238 may result in a greater consumption of the network bandwidth as the replication servers attempt to access the persistent data storage. In addition, the wait for the storage handling module 240 to receive acknowledgement of a commit may be longer, since the storage handling module 240 will have to wait to hear from a greater number of servers.

On the other hand, increasing the amount of cache in a replication server may improve the throughput and/or latency, at the expense of data durability. A larger amount of local cache would allow the replication servers to temporarily store a larger amount of data and return acknowledgements to the storage handling module 240 more frequently. The replication servers may also write to the persistent data storage less often. Therefore, the average throughput may improve and the latency may go down. However, having a larger amount of data in local cache means that in the event of simultaneous failure of all N replication servers, the data loss may be greater, thereby resulting in lower durability. Furthermore, having a larger amount of data in the local cache may increase the chances of data loss due to failure of all N replication servers because of the amount of time that will be needed to write the data to persistent storage. For example, if the cache is sized to hold a week's worth of data (that is, it takes a week to write that data to storage), once one replication server is lost, the window for the other servers to write that data is still one week. If the other servers fail during that week, then data may be lost. Relatively speaking, a larger cache is more likely to have data loss than a smaller cache because the larger cache corresponds to a greater opportunity for all N replication servers to fail before the data in the cache is written to persistent storage.

Increasing the number of hardware units of persistent storage may improve the data durability, for example, by allowing data to be written to more locations, thereby increasing redundancy. Conversely, decreasing the quantity of persistent storage hardware may decrease the data durability. In terms of geographic distribution, the more spread out the persistent storage hardware are, the better it is for fault tolerance, and therefore the data durability may be improved. On the other hand, persistent storage units that are in physical proximity may increase the likelihood of correlated failures that affect a certain geographic area, thereby decreasing the data durability.

The size and spread of persistent storage units may have the opposite effect on latency and throughput. A lower number of hardware units of persistent storage indicates that, on average, the data may be made redundant using lesser number of storage units, thereby reducing the latency. In addition, the closer the persistent storage hardware are located, the less variability in the latency and throughput may be experienced; therefore, the latency and throughput may improve if the persistent storage hardware are less geographically distributed.

The database service may provide the client with different combinations of attributes depending on the price that the client may be paying for using the services. The database service also may provide the client with different levels of quality guarantee for example, an upper or lower bound on the data durability or an upper bound on latency or a minimum throughput experienced in using the system, with different price structures.

Alternatively, or additionally, based on multiple factors, including the level of guarantee or the attributes selected by the user, the replication servers may perform dynamic switching between synchronous and asynchronous replication, or may dynamically select other attributes such as the number N of selected replication servers, the location of the replication servers, the size of local cache in each replication server, the location and/or size of the persistent data storage, when the clone process for the database 238 is instantiated.

Figure 3:
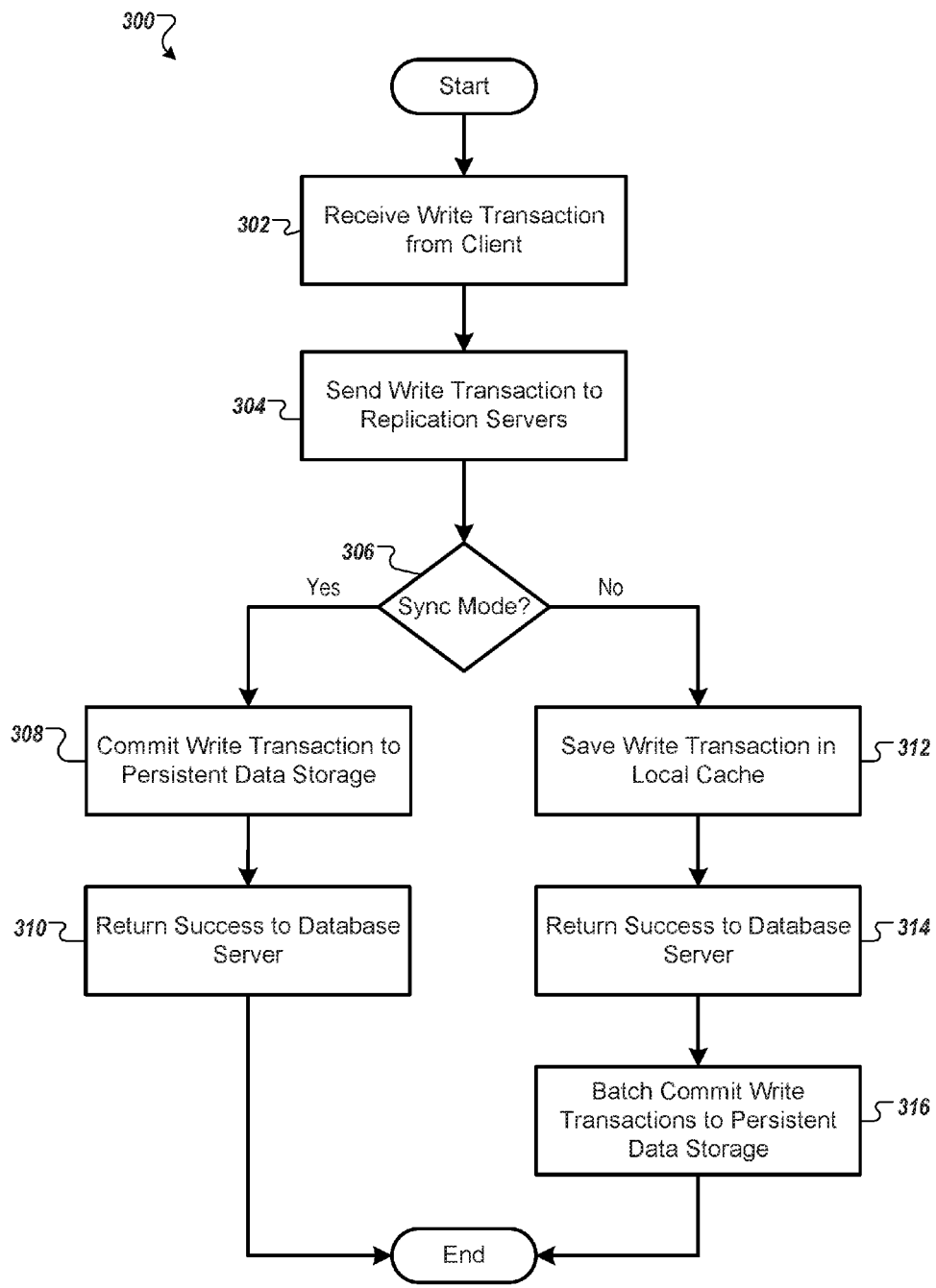
FIG. 3 is a flow chart illustrating an example of a process for performing replicated write transactions in a hosted database service.

FIG. 3 is a flow chart illustrating an example of a process 300 for performing replicated write transactions in a hosted database service. Process 300 may be used to write to data storage providing strong durability and consistency guarantees comparable to synchronous replication, while reducing the latency similar to asynchronous replication. The process 300 may be performed, for example, by the database server 234 and the replication servers 244, 246 and 248 in system 200. The following describes the process 300 as being performed by components of the system 200. However, the process 300 may be performed by other systems or system configurations.

Process 300 begins when a write transaction from a client is received (302). For example, the communications module 236 receives a write request from the service interface 232, which in turn received the write request with associated data from the client application 212 via the network 220. The communications module 236 forwards the write transaction to the clone process in the database server 234 that is handling transactions for the client application 212. The instance of the database 238 in the clone process attempts to access the local disk to perform the write transaction. The write request from the database 238 is intercepted by the storage handling module 240 in the clone process.

The write transaction is sent to replication servers (304). For example, the storage handling module 240 sends RPCs associated with the write transaction to one or more of the N replication servers that are serving the instance of the database 238 (304). In case the write transaction is to be performed synchronously, the storage handling module 240 may send the RPCs to one of the N replication servers. However, in case the write transaction is to be performed asynchronously, the storage handling module 240 sends the RPCs to all N replication servers.

The storage handling module sends additional control information with the write transaction that provides a context for the write transaction. The additional control information may include, for example, a sequence number associated with the particular write transaction, and a unique mastership session identifier (mastership ID) associated with the instance of the database 238 in the clone process serving the client application 212. The storage handling module 240 increments the sequence number for every write transaction. The sequence numbers help to maintain an order for the write transactions. The sequence numbers also aid the storage handling module 240 and the replication servers to maintain information on the current state of the replication servers and the data storage serving the client application 212, for example, information on data for the client application 212 that has been committed to persistent data storage and the data for the client application 212 that may be currently available in the local cache of each of the N replication servers. This is useful in maintaining information on data loss, if any, and on sending read transactions to one of the N replication servers, as described in the following sections.

The mastership ID indicates a lease on the data storage for the clone process handling the particular instance of the database 238 that is serving the client application 212. A clone process with a current mastership ID may perform read or write requests for the client application 212 on the persistent data storage using the N replication servers. Requests from clone processes that do not have a current mastership ID are not successfully processed by the replication servers. The mastership ID may be generated by the storage handling module 240 using a hash on a concatenation of the Internet Protocol (IP) address of the database server 234, a port number of the network interface handling the network connection to a replication server, and a random number.

In some implementations, the storage handling module 240 checks various attributes of the system that are selected by the user of the client device 210 and configures one or more parameters of the system while sending the write transaction to the N replication servers. For example, the storage handling module may set a flag, such as a value of a control bit, which is included in the RPC for the write transaction to indicate whether the particular write transaction should be a synchronous write or an asynchronous write operation.

The write transaction sent from the storage handling module 240 is received at one or more of the N replication servers that is serving the instance of the database 238. In case the write transaction is to be performed synchronously, the transaction may be received at one replication server that is selected by the storage handling module 240 for performing the write transaction. However, in case the write transaction is to be performed asynchronously, the transaction is received at all N replication servers.

In some implementations, a replication server receiving the write transaction checks the value of the control bit that is sent with the write transaction to determine whether the write transaction will be performed in synchronous mode (306). If it is determined that the write transaction is to be performed in synchronous mode, then the replication server receiving the write transaction directly commits the write transaction to the persistent data storage (308), such as data storage 250 and 262. In such instances, the replication servers act merely as proxies for writing to the data storage, and they do not store the data in local cache.

In some other implementations, the local cache may be used for synchronous writes as well as asynchronous writes. In this case, for example, a replication server receiving the write transaction may store the data in the local cache, and a process on the replication server may read the data from the local cache and write to persistent storage as soon as possible. The replication server then sends an acknowledgement after the data is written to persistent storage, in contrast to the an asynchronous write, in which case the replication server would send the acknowledgment in response to receiving the write request, regardless of whether the data has been written to persistent storage.

The synchronous mode offers the highest level of durability guarantees and enables implementation of a database that is synchronously replicated across the geographically distributed database service, while potentially incurring a high level of latency for every write transaction, for example, in the range of 50 to 80 milliseconds, and also being subject to throughput limitations of the underlying replication mechanism that is used by the replication servers.

The commit is considered successful on receiving an acknowledgement from the underlying replication mechanism that the data was written to persistent storage. Upon determining that the commit was successful, the replication server returns success to the database server (310). The replication server may also send to the database server information on the latest sequence number that was committed to data storage.

In some implementations, the control bit that is sent with the write transaction may indicate that the write transaction is to be performed in asynchronous mode. In some other implementations, each transaction may be performed in asynchronous mode by default when a control bit or flag is not included with the request. In either of these scenarios, if the write transaction is to be performed in asynchronous mode (306), then the replication servers save the write transaction to their respective local caches (312) for performing batch writes operations with other data in their local caches.

Each replication server then returns success to the database server (314), such as storage handling module 240 of the database server. In addition, the replication servers send one or more sequence numbers indicating the latest data that has been committed to the data storage, and the start and end sequence numbers of the data that are currently stored in their respective local caches. As described previously, the sequence numbers may help the database server 234, and in particular, the storage handling module 240, to maintain state for each of the replication servers that is useful when sending read transactions. In addition, the sequence numbers may help to identify if there is data loss, for example, data stored in the local caches of the replication servers not being committed due to failure of all N replication servers at the same time.

Each replication server storing data in local cache batch commits the write transactions to persistent data storage (316) at certain trigger points. For example, a replication server may attempt to batch the data in local cache and write the batched data when its local cache is full, or at regular time intervals when the most recent period for locally caching data expires.

When a trigger point is reached, each replication server attempts to commit the data that are locally cached in batches. In some implementations, all N replication servers may attempt to commit the data in batches at the same time, while in other implementations, different replication servers may attempt to commit the batched data at different times. Different replication servers may have different ranges of data in their local caches, with the difference being in the earliest sequence number of the uncommitted data in their local caches. All N replication servers that are active and have some data stored in their local caches have the same sequence number of the most recent data that is written to local cache.

The replication servers may perform a series of checks for consistency before performing the commit, which are described in the following sections. The replication servers may utilize a distributed mechanism for performing the commit for replication across distributed data storage, thereby writing the data to persistent data storage in the local data center (for example, data storage 250), and one or more data storage in remote data centers (for example, data storage 262 in remote data center 260).

In some implementations, the N replication servers compete to acquire a transaction lock to perform the operation, and only one replication server that successfully acquires the transaction lock commits the data to the data storage. The commit is considered successful on receiving an acknowledgement from the underlying replication mechanism that the data was written to persistent storage. The replication servers that did not acquire the transaction lock compare the sequence number of the data that were committed to the sequence number of data in their respective local caches. If it is determined that data in their respective local caches have been committed, then each replication server determines that the commit was successful. Upon determining that the commit was successful, each replication server returns success to the database server (310). Each replication server may also send to the database server information on the latest sequence number that was committed to data storage.

However, in some other implementations, each replication server may attempt to commit the data without acquiring a transaction lock. Therefore, all N replication servers may attempt to commit the data, but only one copy of the data is written to persistent data storage by the underlying replication mechanism. One of the N replication servers determines that the commit is successful on receiving an acknowledgement from the underlying replication mechanism that the data it was attempting to commit was written to persistent data storage. The other replication servers that do not receive such acknowledgement compare the sequence numbers of the data that were committed to the sequence numbers of data in their respective local caches. If it is determined that data in their respective local caches have been committed, then each replication server determines that the commit was successful. Upon determining that the commit was successful, each replication server returns success to the database server (310), as described previously.

As described previously, the asynchronous mode may provide higher throughput compared to the synchronous mode and reduce latency, but with a small risk of data loss. The level of throughput and latency may depend on the number and location of the replication servers. For example, using three replication servers located in the same data center may have latency in the order of 1 millisecond, while using the same number of replication servers distributed in different data centers in a metropolitan area may have latency in the order of 20 milliseconds. As described previously, in some implementations the number of replication servers and the location of the replication servers may be user configurable and may depend on the level of service selected by the user, with a specified price structure.

The risk of data loss depends on all N replication servers failing within a time window t with uncommitted data being present in their local caches. The risk of data loss may be mitigated by selecting a higher number of replication servers, and by distributing the replication servers across multiple regions. For example, for an implementation where N is originally three, a fourth replication server may be used (that is, N is set to four) and a forced commit of the uncommitted data may be performed when the system detects that the local cache of only a single replication server has uncommitted data. The forced commit may provide better durability while increasing the average latency for commits.

Figure 4:
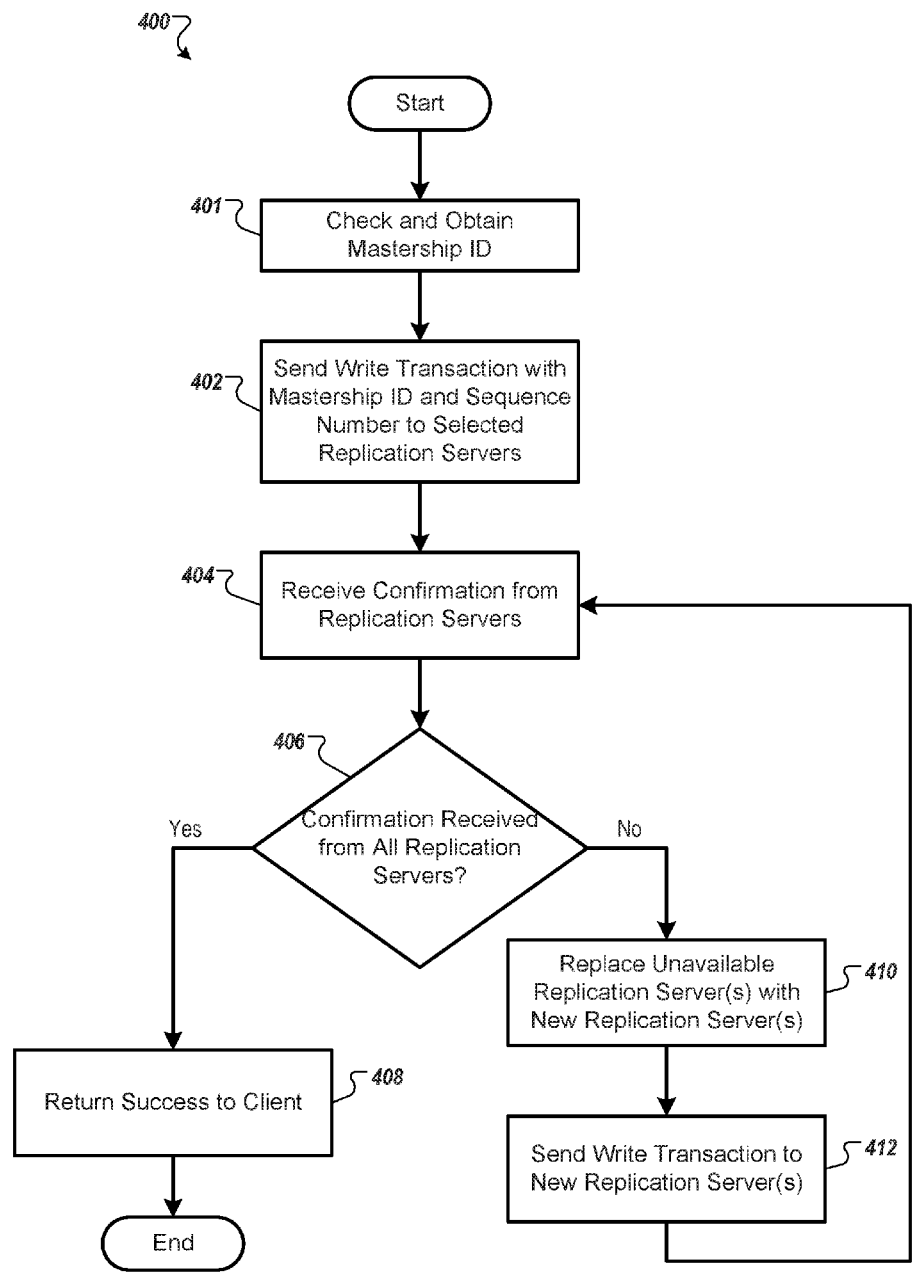
FIG. 4 is a flow chart illustrating an example of a process for performing replicated write transactions by a database server using multiple replication servers.

FIG. 4 is a flow chart illustrating an example of a process 400 for performing replicated write transactions by a database server using multiple replication servers. The process 400 may be performed, for example, by the database server 234. The following describes the process 400 as being performed by components of the system 200. However, the process 400 may be performed by other systems or system configurations.

The process 400 starts by checking and obtaining a mastership ID (401). For example, the database server 234 checks whether it has a current mastership ID for serving an instance of the database 238, and obtains a mastership ID if needed, upon receiving a write transaction for the instance of the database 238. The write transaction may have been generated by the client application 212 and received at the database server 234 by the communications module 236 from the service interface 232. The communications module 236 forwards the write transaction to the instance of the database 238 that is serving the application 212.

For example, upon receiving a read or write transaction, the communications module 236 checks whether an instance of the database 238 exists for serving requests from the client application 212. If an instance of the database 238 does not exist, then the communications module 236 creates an instance of the database 238 and spawns a clone process of the storage handling module 240 to serve that instance. The database server 234 may serve multiple instances of the database 238, but any one instance of the database 238 may be served by only one clone process at a time.

Upon creation of the clone process, or if the clone process is already existing, the database server 234 acquires mastership of the instance before it can service the request from the client application 212. This may be applicable to both read and write transactions. If the clone process does not have a current mastership, either because it is newly created or for some other suitable reason, the storage handling module 240 also generates a unique session identifier for the mastership ID to identify the session for which the instance of the database 238 has the mastership. In order to acquire mastership, the storage handling module 240 may send a RPC for modifying the mastership of the instance to a randomly chosen replication server that is selected to serve as a proxy for writing a lease to the underlying replication mechanism. The RPC includes the mastership ID generated by the storage handling module 240. All subsequent read and write transactions for the storage handling module 240 serving the particular instance of the database 238 are identified by the mastership ID.

The storage handling module 240 may periodically renew the mastership ID by sending an RPC to one replication server for renewing the lease on the data in persistent storage, and for returning the renewed lease. The replication server may be one of the N replication servers, or it may be a different replication server. The storage handling module 240 also may release the lease when it is done serving the instance of the database 238. In order to release the lease, the storage handling module 240 may issue an empty RPC to the selected N replication servers in synchronous mode, such that all N replication servers commit the data in their local caches to persistent storage and then empty the local caches.

After obtaining or checking the mastership or lease on the persistent storage for performing transactions for the instance of the database 238, the database server 234 sends RPCs for the write transaction, along with the mastership ID and a sequence number, to selected replication servers (402). After sending the write transaction to one or more of the N replication servers that are serving the instance of the database 238, the storage handling module 240 waits to receive confirmation from the replication servers (404) that the write transaction was successfully committed to persistent storage.

The N replication servers are selected when the clone process is spawned for serving the instance of the database 238, from a pool of replication servers that are available to serve different instances of the database 238. The replication servers in the pool are distinct from the database server 234. The replication servers in the pool, and also the N selected replication servers, may be present in different data centers that are geographically distributed. In some implementations, the selection of the N replication servers may be done randomly, while in other implementations, the selection may be based on attributes that are chosen by the user of the client device 210, and/or on the level of quality guarantee that is provided to the user of the client device 210, as described previously.

The storage handling module 240 may wait for a predetermined timeout interval to receive confirmation from the replications servers. For example, the timeout interval may be 10 milliseconds such that the storage handling module 240 waits for 10 milliseconds after sending the RPCs to receive confirmation from all N replication servers.

Upon receiving a confirmation from any replication server, the storage handling module 240 checks whether it has received confirmation of the write transaction from all N replication servers (406). If confirmation is received from all N replications servers within the timeout interval, then the write transaction is determined to have been successfully committed, and the database server 234 returns success to the client application (408). If the cache for the instance of the database 238 on a replication server is full, a write transaction to the cache will block until the replication server is able to free up some space in its cache, for example, after the next successful commit to data storage. Blocked transactions may result in higher latency; they may be avoided by smart cache management.

On the other hand, if the timeout interval expires without receiving confirmation from at least one replication server, then the particular replication server is considered to have failed. In such an event, the storage handling module 240 replaces the unavailable replication server with a new replication server (410), which may be selected from the pool of available replication servers. The replacement of the unavailable replication server may be achieved quickly by maintaining the pool of available replication servers. In addition, since a replication server is replaced if a single write transaction fails, the local caches on the replication servers always have a contiguous range of write transactions, and there are no gaps in the data in the local caches. This is because, for asynchronous writes, each of the N active replication servers receives every write transaction, which are at contiguous sequence numbers. Therefore, the local cache of each active replication server contains a contiguous sequence of writes. A new replication server that replaces a failed replication server will see all future writes. So the new replication server will have a contiguous sequence of writes in its local cache.

The new replication server will have no data for the particular instance of the database 238 in its cache, and, in one implementation, the data that currently may exist in the cache of the other N−1 replication servers is not copied to the cache of the new replication server. In this case, the storage handling module 240 sends the write transaction to the new replication server (412), and repeats the process of waiting for a period of time equal to the timeout interval to receive confirmation from the new replication server (404). Even if a replacement replication server starts with an empty cache for the particular instance of the database 238, the data in the cache of the replacement replication server matches up with the data in the caches of the other N−1 replication servers within a finite amount of time, based on the other replication servers emptying their caches after successful commits, and also based on all the N replication servers receiving the new write transactions. This is because all N replication servers eventually reach a point where the oldest data in their local caches is at a sequence number that is greater than or equal to the sequence number of the first write transaction in the local cache of the new replication server. At this point, the new replication server has "caught up" with the other N−1 replication servers.

If confirmation is received from the new replication server within the timeout interval, thereby completing the quorum of N replication servers from which confirmations have been received, then the write transaction is determined to have been successfully committed. The database server 234 returns success to the client application (408). However, if the timeout interval expires without receiving confirmation from the new replication server, then the process may repeat for selecting another replication server and writing data to the newly selected replication server. However, in some implementations, this behavior may not repeat indefinitely. The process may limit the total time of the write operation or the number of replication servers it will try to use before reporting to the client application that the write transaction has failed.

Figure 5:
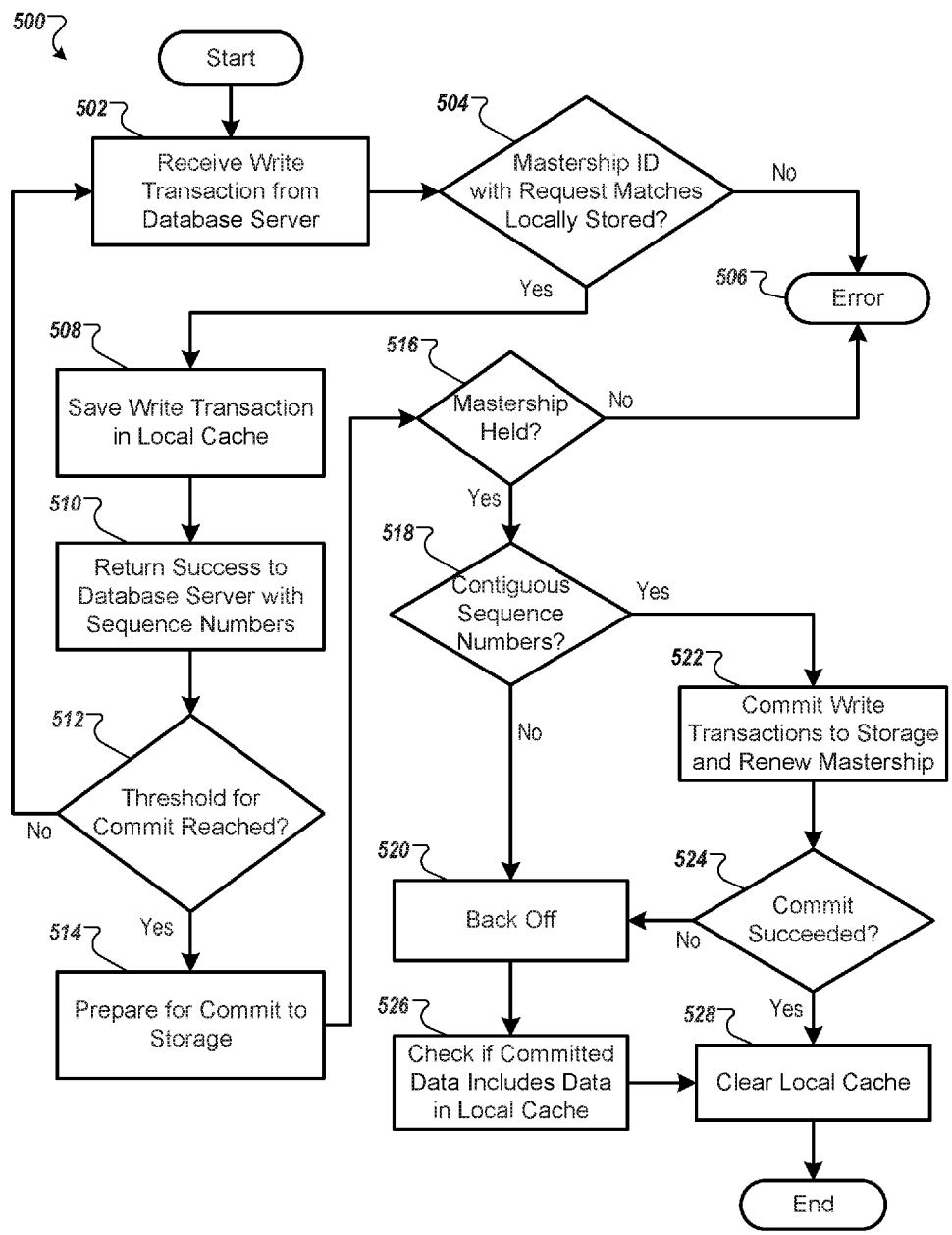
FIG. 5 is a flow chart illustrating an example of a process for performing write transactions by a replication server.

FIG. 5 is a flow chart illustrating an example of a process 500 for performing write transactions by a replication server. The process 500 may be performed, for example, by any one of the replication servers 244, 246 and 248. The following describes the process 500 as being performed by components of the system 200. However, the process 500 may be performed by other systems or system configurations.

The process 500 starts when a replication server receives a write transaction from a database server (502). For example, the replication server may be one of N replication servers selected for serving an instance of the database 238 that performs read/write transactions for the client application 212.

The write transaction that is received may include a mastership ID that identifies the session for which the instance of the database 238 has the mastership. The replication server checks whether the mastership ID sent with the write request matches locally stored mastership ID for the particular session (504). The replication server compares the mastership IDs to confirm that the clone process that sent the write transaction currently has the lease on the data storage for writing data for the instance of the database 238.

If the mastership IDs do not match, then the replication server generates an error (506). For example, in some implementations, the replication server may send an error message to the storage handling module 240 serving the particular instance of the database 238. The error message may indicate that the mastership IDs did not match. In other implementations, the replication server may discard the write transaction without sending any message to the storage handling module 240.

On the other hand, if the mastership IDs match, the replication server determines that the instance of the database 238 that sent the write transaction currently holds the lease for writing data for the client application 212. Based on the determination, the replication server saves the write transaction in its local cache (508). Upon successfully saving the data in local cache, the replication server returns a success indication to the database server, along with sequence numbers (510). As described previously, the replication server sends the start sequence number of the data that is currently in its local cache. The replication server also sends the most recent sequence number of the data that has been committed for the particular instance of the database 238. In addition, in some implementations, the replication server may send the cache end sequence numbers. However, in other implementations, the replication server may not send the cache end sequence numbers. In such implementations, the storage handling module 240 may determine the cache end sequence number based on its knowledge of the sequence number of the latest write transaction that has been sent to the replication servers. The sequence number of the latest write transaction sent to the replication servers represents the latest sequence number that is expected to have been written to the local cache of the replication servers and is expected to be the same as the cache end sequence number for each replication server that has data written to its local cache.

The replication server checks whether a threshold for committing the data is reached (512). In some implementations, the replication server checks whether the trigger point is reached for writing the data in its local cache for the particular instance of the database 238. The threshold or trigger point may be a certain percentage of the local cache getting filled with uncommitted data. Alternatively, the trigger point may be the expiration of a time period for caching the data.

If the threshold is not reached, the replication server may continue to receive write transactions from the storage handling module 240 for the particular instance of the database 238. In some implementations, each replication server may perform in parallel the operations of writing new data to its local cache and committing previously written data from its local cache to persistent data storage. For example, a replication server may execute a separate process that is active as long as there is data in the cache, and the process commits data and updates the local cache. This process may run in parallel with another process that serves requests from the database server and writes data to the local cache of the replication server.

On the other hand, if the threshold for committing the data is reached, the replication server prepares for committing to storage the data in its local cache (514). The replication server may obtain a token from the underlying replication mechanism in order to determine whether another commit happened between the start of the commit process by the replication server and the actual commit. In addition, the replication server determines whether the mastership is still held (516) by comparing whether the session identifier of the latest lease in persistent data storage matches the mastership ID for the clone process. The replication server may also check whether the lease is free. The check whether the mastership is held guarantees that only the instance that currently holds the lease can commit the data.

If the comparison of the mastership IDs returns a mismatch, the replication server may return an error (506). The error may be due to the clone process that sent the write transaction being a zombie instance, that is, a database process that is no longer serving the instance of the database 238, but that has persisted in the database server 234 beyond its useful lifetime. Zombie instances may be created, for example, if the clock in the database server 234 malfunctions. A zombie instance may serve read requests directly from its cache, and also may succeed in writing to the local caches of the replication servers.

In some implementations, the replication server may send an error message to the storage handling module 240 serving the particular instance of the database 238. The error message may indicate that the mastership IDs did not match, and/or may indicate that the clone process may be a zombie instance. In some other implementations, the replication server may discard the write transaction without sending any message to the storage handling module 240.

On the other hand, if the comparison of the mastership IDs returns a match, the replication server determines that storage handling module 240 that sent the write transaction is the instance that currently holds the lease. The replication server then compares sequence numbers. The replication server checks whether the sequence numbers are contiguous (518), that is, there is no gap between the latest committed sequence number in data storage, and the earliest sequence number it is trying to commit. If the replication server determines that the sequence numbers are not contiguous, then the replication server backs off (520) instead of attempting to commit the data, and waits for a predetermined back off period. This guards against data corruption from out-of-order commits.

On the other hand, if the replication server determines that the sequence numbers are contiguous, then the replication server proceeds with the commit of the write transactions to the data storage and renews the mastership (522). As described previously, the replication server attempts to commit the write transactions to data storage based either on acquiring a transaction lock, or by simply attempting to commit without a lock. As part of the commit, the replication server writes the data in its local cache for the particular instance of the database 238, to the data storage using the underlying replication mechanism. The replication server updates the latest committed sequence number to the highest sequence number in its commit. In addition, the replication server renews the mastership, that is, it renews the lease that is held on the data storage for the clone process serving the particular instance of the database 238.

The replication server then determines whether the commit succeeded (524). For example, the replication server may receive an acknowledgement from the underlying replication mechanism that the data was written to the data storage. If the replication server does not receive any such acknowledgement within a predetermined timeout interval, it determines that the commit was not successful. Based on such a determination, the replication server backs off (520) and waits for a predetermined back off period.

However, if the replication server receives an acknowledgement within the predetermined timeout interval, it determines that the commit was successful. Based on such a determination, the replication server clears all data from its local cache (528).

If the replication server had backed off, then at the expiry of back off period the replication server checks if the committed data includes data that is present in its local cache (526). The replication server obtains from the underlying replication mechanism the latest committed sequence number in data storage, and compares the latest committed sequence number to the sequence number of data in the local caches. If the replication server determines that all or some of the data in the local cache has been committed, for example by one of the N−1 other replication servers, then the replication server clears the corresponding data from its local cache (528). In some implementations, the replication server empties the local cache if it determines that all the data in its local cache have been committed by another replication server.

If the local cache was full, upon clearing some or all of the data from its local cache, the replication server is again ready to accept write transactions from the storage handling module 240 for the particular instance of the database 238. However, if the local cache was partly full, then the replication server may perform in parallel writing new transactions to its local cache, and committing previously stored transactions to persistent data storage.

In some implementations, each replication server commits the data in its local cache independent of the other replication servers. In addition, a replication server may continue to commit data, and renew the lease, as long as it has data in its local cache. The replication server may continue to perform the commit even if the storage handling module 240 serving the instance of the database 238 crashes. Moreover, in some implementations, until the replication server has completed the commit, that is, until all the data in its local cache has been written to persistent data storage, no other clone process may acquire a lease on the data and serve the instance of the database 238. This may help to ensure that an instance of the database 238 is not served by a new clone process until its pending data have been committed.

Figure 6:
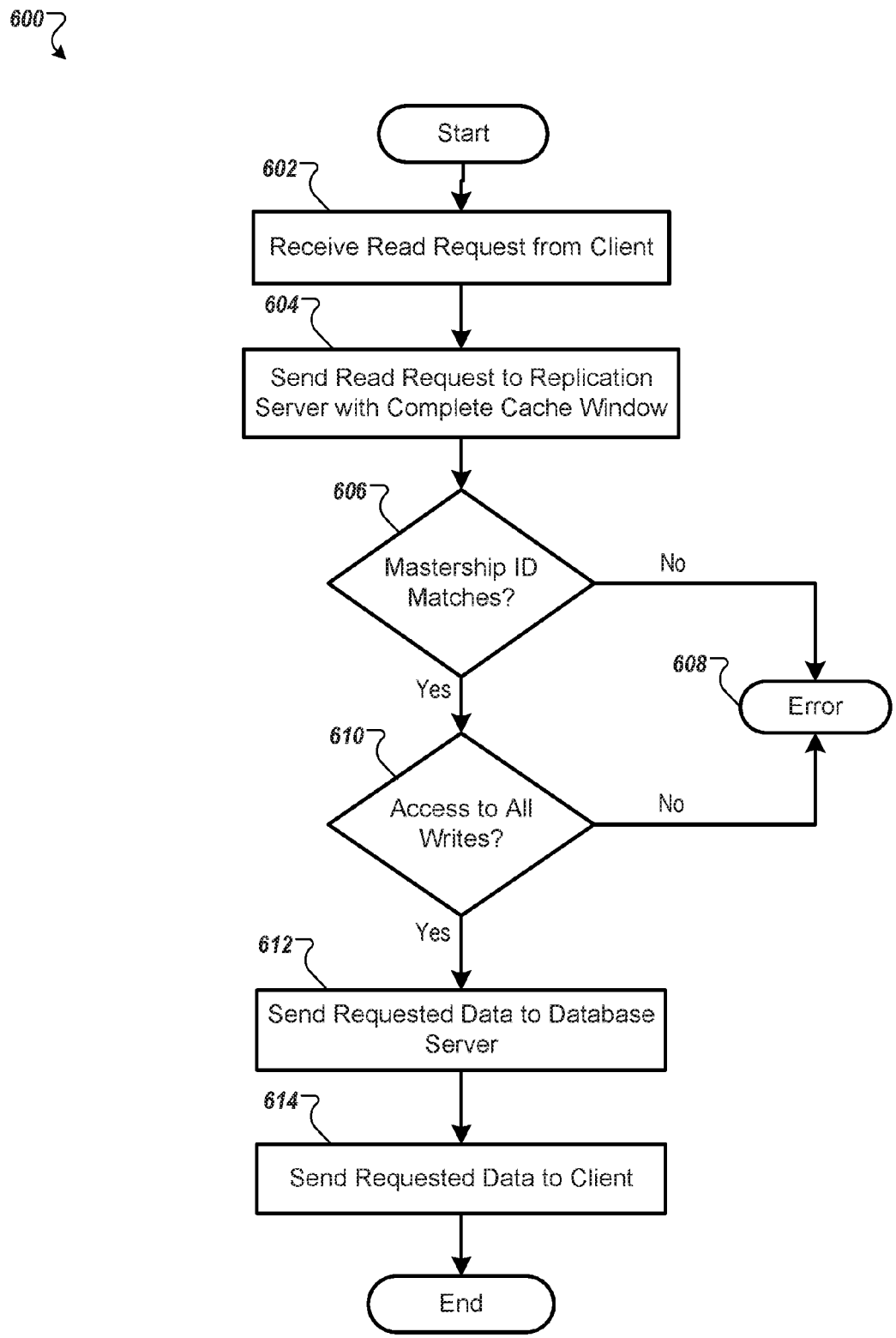
FIG. 6 is a flow chart illustrating an example of a process for performing read transactions in a hosted database service.

FIG. 6 is a flow chart illustrating an example of a process 600 for performing read transactions in a hosted database service. The process 600 may be performed, for example, by the database server 234 and the replication servers 244, 246 and 248 in system 200. The following describes the process 600 as being performed by components of the system 200. However, the process 600 may be performed by other systems or system configurations.

The process 600 begins when a read request is received from a client (602), for example, from the client application 212 at the communications module 236 of the database server 234. The communications module 236 receives the read request from the service interface 232, which in turn received the read request with associated data from the client application 212 via the network 220. The communications module 236 forwards the read request to the clone process in the database server 234 that is serving the instance of the database 238 handling transactions for the client application 212. The instance of the database 238 in the clone process may attempt to access the local disk to perform the read transaction. The read request from the database 238 is intercepted by the storage handling module 240 serving the instance of the database 238 in the clone process.

The storage handling module sends the read request to a replication server that has the complete cache window (604). For example, the storage handling module 240 generates one or more RPCs associated with the read request and sends the RPCs to a replication server that has the complete cache window. Generally speaking, the cache window of a replication server indicates the amount of data that is present in the local cache of the replication server, that is, the total number of cached transactions that are not yet committed. The cache window may be computed as the value of the difference between the cache start sequence number and the cache end sequence number for the transactions in the local cache. A cache window is considered to be a complete cache window if the cache start sequence number is one higher than the latest committed sequence number, and the cache end sequence number corresponds to the highest sequence number of the uncommitted data that has been received from the storage handling module 240. In some implementations, the local cache may have a cache start sequence number that is lower than the latest committed sequence number. However, the local cache may still have data with a sequence number that is one higher than the latest committed sequence number. In such implementations, the cache window is considered a complete cache window if the cache end sequence number corresponds to the highest sequence number of the uncommitted data that has been received from the storage handling module 240.

Therefore, a replication server that has the complete cache window is a replication server that has all the uncommitted data for the instance of the database 238 in its local cache and the data in its local cache is contiguous with the data that have been committed. In order to send the read request to the particular replication server, the clone process keeps track of the cache windows of all N replication servers, as described in the following sections.

The read request sent from the storage handling module 240 includes with the request the mastership ID for the instance of the database 238. The replication server that receives the read request checks whether the mastership ID matches (606). The replication server performs the check by determining whether the mastership ID sent with the read request matches the mastership ID stored locally at the replication server for the particular session. The replication server compares the mastership IDs to confirm that the clone process that sent the read transaction is the instance that currently has the lease on the persistent data storage for reading data for the instance of the database 238 serving the client application 212.

If the mastership IDs do not match, then the replication server generates an error (608). In some implementations, the replication server may send an error message to the storage handling module 240 serving the particular instance of the database 238. The error message may indicate that the mastership IDs did not match. In other implementations, the replication server may discard the read transaction without sending any message to the storage handling module 240.

On the other hand, if the mastership IDs match, the replication server checks whether it has access to all the writes (610), that is, data up to and including the latest written sequence number for the particular instance of the database 238. Some of the data may be in its local cache and not yet written to the persistent data storage. If the replication server determines that it does not have access to all the data, then it generates an error (608). In some implementations, the replication server may send an error message to the storage handling module 240 serving the particular instance of the database 238. The error message may indicate that the replication server does not have access to all the data. In other implementations, the replication server may discard the read transaction without sending any error message to the storage handling module 240.

If the replication server determines that it has access to all the data, then it retrieves the data and sends the requested data to the database server (612). The requested data may include data retrieved from persistent data storage, or uncommitted data that is present in the local cache of the replication server, or both. If there is uncommitted data in the local cache, then the read transaction is performed on the local cache, and on the persistent data storage if needed. However, if there is no data in the local cache, then the read request may be performed directly on the persistent data storage. Along with the requested data, the replication server may send the latest committed sequence number and the start and end sequence numbers of the data in its cache.

Upon receiving the requested data from the replication server, the particular instance of the database 238 sends the requested data to the client application (614). In addition, the storage handling module 240 serving the particular instance of the database 238 saves the sequence numbers that are received with the data. The sequence numbers help to determine replication servers with the complete cache window, and determine whether there has been any data loss, as described in the following sections.

The multiple checks performed by the replication server to determine whether the mastership ID matches and whether it has access to all the writes guarantees that if the read request is successful, it will be strongly consistent, that is, the data that is returned is the most recent data for the client application 212.

Figure 7:
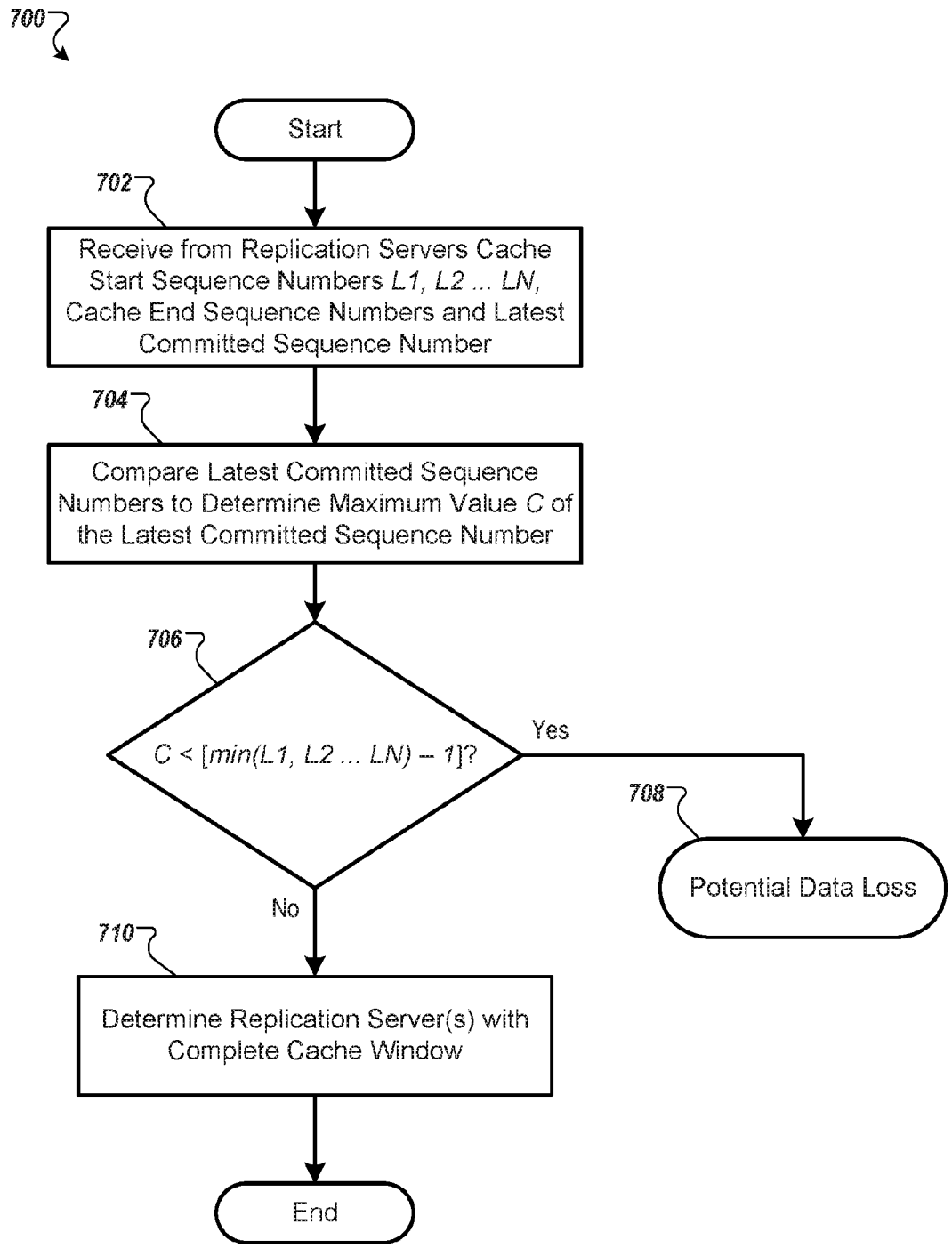
FIG. 7 is a flow chart illustrating an example of a process for determining data loss and identifying a replication server with the complete cache window.

FIG. 7 is a flow chart illustrating an example of a process 700 for determining data loss and identifying a replication server with the complete cache window. The process 700 may be performed, for example, by the storage handling module 240 serving an instance of the database 238. The following describes the process 700 as being performed by components of the system 200. However, the process 700 may be performed by other systems or system configurations.

The process 700 starts when the storage handling module receives from the replication servers the cache start sequence numbers L1, L2 ... LN, the cache end sequence numbers and the latest committed sequence number (702). As described previously, the cache start sequence, cache end sequence and the latest committed sequence number correspond to a clone process serving a particular instance of the database that may be serving the client application. For example, the storage handling module 240 receives, from each of the N replication servers, the start sequence number for the uncommitted data in its cache, and also the latest committed sequence number that is known to the particular replication server. The start sequence number provides a lower bound on the oldest sequence number that is present in the local cache of the particular replication server.

In some implementations, the storage handling module 240 also receives the cache end sequence number from each replication server. The cache end sequence number provides an upper bound on the latest sequence number stored in the local cache of the particular replication server. Alternatively, the storage handling module 240 may determine the cache end sequence number based on its knowledge of the sequence number of the latest write transaction that has been sent to the replication servers. The sequence number of the latest write transaction sent to the replication servers represents the latest sequence number that has been written to the local cache of the replication servers and is the same as the cache end sequence number for each replication server.

The storage handling module compares the latest committed sequence numbers to determine maximum value C of the latest committed sequence number that has been committed to the data storage (704). For example, the storage handling module 240 determines C as the maximum of the latest committed sequence numbers received from the N replication servers.

Upon determining C, the storage handling module determines whether C<[min(L1, L2 ... LN)−1] (706), that is, whether the highest sequence number that has been committed to data storage is not contiguous with the lowest sequence number of the data present in the local caches of any of the N replication servers. If the storage handling module determines that C is less than [min (L1, L2 ... LN)−1], that indicates that no replication server has sequences of data in the gap and therefore there may be potential data loss (708). This may be the case, for example, when all N replication servers may have failed within a time window t without writing the uncommitted data in their local caches.

On the other hand, if C is not less than [min (L1, L2 ... LN)−1], then at least one of the N replication servers has contiguous sequence numbers in its local cache and data has not been lost. The storage handling module determines which replication servers have the complete cache window (710). For example, the storage handling module 240 computes the cache window for each of the N replication servers, and determines which replication servers have the complete cache window, as described previously. The storage handling module 240 receives the sequence numbers from the replication servers with acknowledgement for each read or write transaction. Based on the sequence numbers, the storage handling module 240 determines, for every transaction, one or more replication servers with the complete cache window and whether there has been data loss. The storage handling module 240 selects a replication server with the complete cache window and sends read transactions to the selected replication server.

Figure 8:
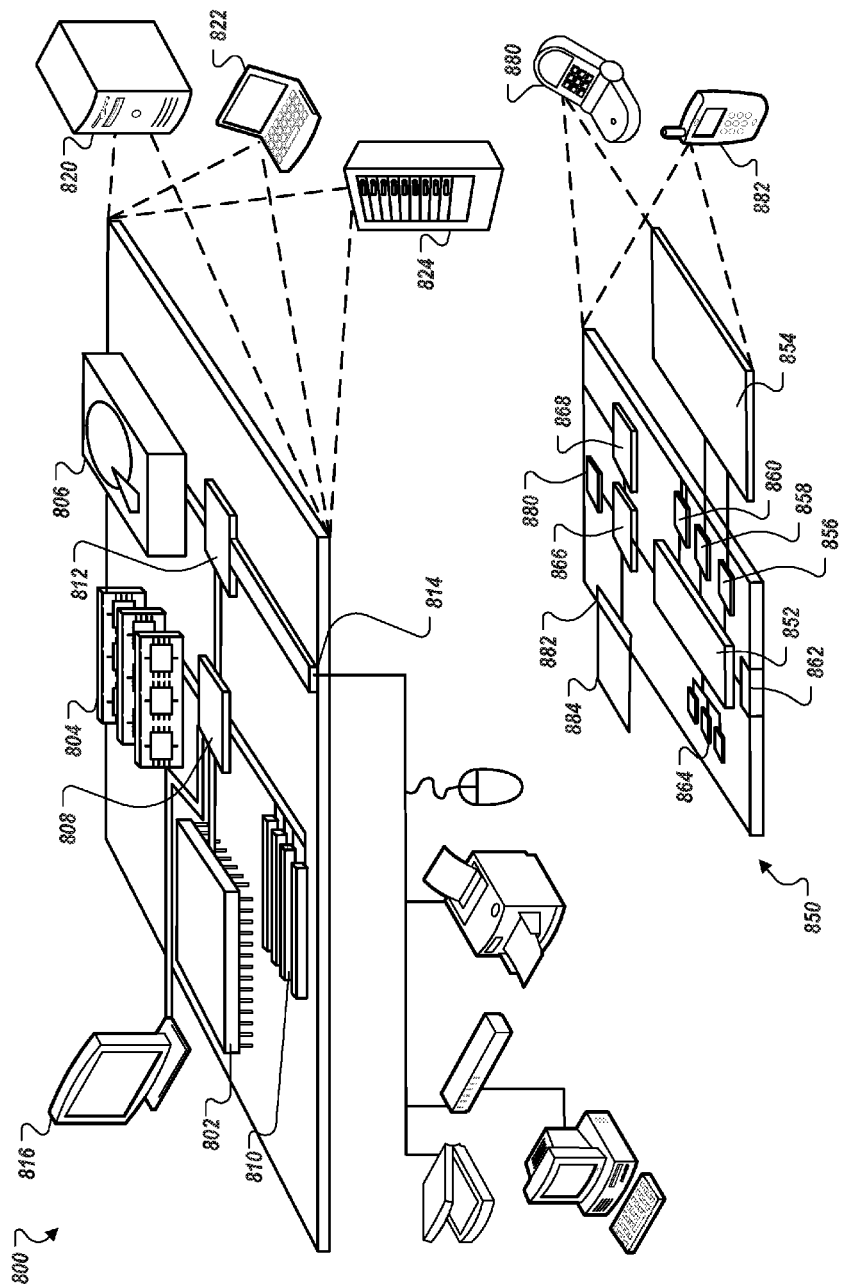
FIG. 8 shows an example of a computing device and a mobile computing device that can be used to implement the techniques described here.

FIG. 8 shows an example of a computing device 800 and a mobile computing device 850 that can be used to implement the techniques described here. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. In addition, multiple computing devices may be connected, with each device providing portions of the necessary operations (for example, as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or include a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (for example, through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (for example, USB, Bluetooth, Ethernet, wireless Ethernet) may be coupled to one or more input/output devices, such as a keyboard, a pointing device, a scanner, or a networking device such as a switch or router, for example, through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may include one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single Inline Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provide as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier such that the instructions, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth, Wi-Fi, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, for example, in a handset of the mobile computing device 850. Such sound may include sound from voice telephone calls, may include recorded sound (for example, voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (for example, magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (for example, a CRT (cathode ray tube) or LCD (liquid crystal display) monitor) for displaying information to the user and a keyboard and a pointing device (for example, a mouse or a trackball) by which the user can provide input to the computer. Other kinds of devices can be used to provide for interaction with a user as well; for example, feedback provided to the user can be any form of sensory feedback (for example, visual feedback, auditory feedback, or tactile feedback); and input from the user can be received in any form, including acoustic, speech, or tactile input.

The systems and techniques described here can be implemented in a computing system that includes a back end component (for example, as a data server), or that includes a middleware component (for example, an application server), or that includes a front end component (for example, a client computer having a graphical user interface or a Web browser through which a user can interact with an implementation of the systems and techniques described here), or any combination of such back end, middleware, or front end components. The components of the system can be interconnected by any form or medium of digital data communication (for example, a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, the logic flows depicted in the figures may not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method comprising:
   providing, to a user associated with a client application, a set of different levels of quality guarantee associated with a database server, wherein the database server is configured for performing reads and writes on persistent data storage for the client application;
   receiving, from the user, selection of a particular level of quality guarantee from the set of different levels of quality guarantee;
   responsive to receiving the selection of the particular level of quality guarantee, determining values of one or more attributes associated with the database server, the one or more attributes including different values for different levels of quality guarantee; and
   based on determining the values of the one or more attributes, configuring a set of replications servers for performing read and write operations on the persistent data storage based on the read and write requests from the client application;
   receiving, at a database server, a write request;
   in response to receiving the write request, selecting, by the database server, a set of multiple replication servers based on the determined value of the one or more attributes;
   sending the data from the database server to the selected set of multiple replication servers for writing to the persistent data storage;
   determining that less than all of the replication servers successfully wrote the data to the persistent data storage; and
   in response to determining that less than all of the replication servers successfully wrote the data to the persistent data storage, selecting, by the database server and based on the determined value of the one or more attributes, one or more additional replication servers as replacement for the replication servers that did not successfully write the data to persistent storage; and
   sending the data from the database server to the additional replication servers.

2. The method of claim 1, wherein a replication server is configured for performing read and write operations directly on the persistent data storage.

3. The method of claim 1, wherein the different levels of quality guarantee are based on different price structures.

4. The method of claim 1, wherein the one or more attributes include data durability provided to data associated with the client application, latency experienced by the client application in using the database server for performing read and write requests on the persistent data storage and peak throughput of the replication servers in writing data to the persistent data storage.

5. The method of claim 4, wherein configuring a set of replications servers comprises:
   selecting a number and geographic distribution of replication servers for performing read and write requests on persistent data storage for the client application, the number and the geographic distribution based on the value of data durability to be provided to data associated with the client application.

6. The method of claim 5, wherein the number of the replication servers selected is higher for higher values of data durability than lower values of data durability.

7. The method of claim 5, wherein the geographic distribution of the replication servers selected is greater for higher values of data durability than lower values of data durability.

8. The method of claim 7, wherein the geographic distribution of the replication servers selected is lower for higher values of the peak throughput.

9. The method of claim 4, wherein configuring a set of replications servers comprises:
configuring a size of local cache in each replication server, the local cache in a replication server configured for temporary storage of data for the client application before being written to the persistent data storage.

10. The method of claim 9, wherein the size of the local cache in a replication server is configured to be smaller for higher values of data durability than lower values of data durability.

11. The method of claim 10, wherein the size of the local cache in a replication server is configured to be larger for lower values of latency experienced by the client application than higher values of latency.

12. The method of claim 10, wherein the size of the local cache in a replication server is configured to be larger for higher values of the peak throughput.

13. The method of claim 10, wherein configuring a set of replications servers comprises:
selecting a number and geographic distribution of persistent data storage for performing read and write requests for the client application, the number and the geographic distribution based on at least one of the value of data durability to be provided to data associated with the client application and the latency experienced by the client application.

14. The method of claim 13, wherein the number of the persistent data storage selected is higher for higher values of data durability than lower values of data durability.

15. The method of claim 13, wherein the number of the persistent data storage selected is lower for lower values of latency experienced by the client application than higher values of latency.

16. The method of claim 13, wherein the geographic distribution of the persistent data storage selected is greater for higher values of data durability than lower values of data durability.

17. The method of claim 13, wherein the geographic distribution of the persistent data storage selected is lower for higher values of the peak throughput.

18. The method of claim 1, further comprising:
receiving, at the database server from the user of the client application at a time when the database server is processing read and write requests for the client application based on the particular level of quality guarantee selected previously, selection of a new level of quality guarantee from the set of different levels of quality guarantee, the new level of quality guarantee being different from the particular level of quality guarantee selected previously;
responsive to receiving the selection of the new level of quality guarantee, determining new values of the one or more attributes associated with the database server; and
based on the new values of the one or more attributes, configuring a new set of replications servers for performing read and write operations on the persistent data storage based on the read and write requests from the client application.

19. The method of claim 1, wherein selecting the set of multiple replication servers in response to receiving the write request comprises:
determining, by the database server, that a mastership is acquired by the database server for servicing the write request; and
in response to determining that a mastership is acquired, selecting, by the database server, the set of multiple replication servers.

20. The method of claim 19, wherein the mastership indicates a lease on persistent data storage by an instance of the database server that is configured for servicing the write request from the client application.

21. The method of claim 1, wherein selecting the set of multiple replication servers comprises:
selecting the set of multiple replication servers from an available pool of replication servers based on a random selection mechanism.

22. The method of claim 1, wherein selecting the set of multiple replication servers comprises:
determining an attribute chosen by a user associated with the client application, the attribute selected from the group consisting of a number of replication servers, location of replication servers, size of cache in each replication server used for the client application, location of the persistent data storage and size of the persistent data storage; and
selecting the set of multiple replication servers based on the determined attribute.

23. The method of claim 1, wherein selecting the set of multiple replication servers comprises:
performing the selection of the set of multiple replication servers independently for each write request.

24. The method of claim 1, further comprising:
receiving, at the database server, confirmation from the one or more additional replication servers; and
in response to receiving confirmation from the one or more additional replication servers, sending from the database server to the client application, information indicating success of the write request.

25. A computer program product embodied in a non-transitory machine-readable medium and including instructions executable by one or more computers, the instructions configured to cause the one or more computers to perform operations comprising:
providing, to a user associated with a client application, a set of different levels of quality guarantee associated with a database server, wherein the database server is configured for performing reads and writes on persistent data storage for the client application;
receiving, from the user, selection of a particular level of quality guarantee from the set of different levels of quality guarantee;
responsive to receiving the selection of the particular level of quality guarantee, determining values of one or more attributes associated with the database server, the one or more attributes including different values for different levels of quality guarantee; and
based on determining the values of the one or more attributes, configuring a set of replications servers for performing read and write operations on the persistent data storage based on the read and write requests from the client application;
receiving, at a database server, a write request;
in response to receiving the write request, selecting, by the database server, a set of multiple replication servers based on the determined value of the one or more attributes;

sending the data from the database server to the selected set of multiple replication servers for writing to the persistent data storage;

determining that less than all of the replication servers successfully wrote the data to the persistent data storage; and in response to determining that less than all of the replication servers successfully wrote the data to the persistent data storage, selecting, by the database server and based on the determined value of the one or more attributes, one or more additional replication servers as replacement for the replication servers that did not successfully write the data to persistent storage; and sending the data from the database server to the additional replication servers.

* * * * *